(12) United States Patent
Gehrmann et al.

(10) Patent No.: US 12,368,819 B2
(45) Date of Patent: Jul. 22, 2025

(54) PRIVACY PRESERVING ONLINE VIDEO CAPTURING AND RECORDING

(71) Applicant: Adeia Guides Inc., San Jose, CA (US)

(72) Inventors: Christian Gehrmann, Lund (SE); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 242 days.

(21) Appl. No.: 18/128,050

(22) Filed: Mar. 29, 2023

(65) Prior Publication Data

US 2024/0333874 A1    Oct. 3, 2024

(51) Int. Cl.
*H04N 7/15* (2006.01)
*G06T 5/20* (2006.01)
(Continued)

(52) U.S. Cl.
CPC ............. *H04N 7/152* (2013.01); *G06T 5/20* (2013.01); *G06T 5/70* (2024.01); *G06T 17/00* (2013.01);
(Continued)

(58) Field of Classification Search
CPC ........ G06F 16/951; G06F 18/211; G06T 5/20; G06T 5/70; G06T 7/90; G06T 7/215; G06T 17/00; G06V 10/255; G06V 10/28; G06V 20/46; G06V 20/635; G06V 40/20; G06V 2201/07; G06V 10/25; G11B 19/18; G11B 27/031; H04L 12/1822; H04L 12/1818; H04L 12/1827; H04L 65/4046; H04N 5/2624; H04N 5/2628; H04N 7/147; H04N 7/15; H04N 7/152; H04N 7/155; H04N 7/157; H04N 21/23418; H04N 21/251; H04N 21/41407; H04N 21/4223; H04N 21/4312; H04N 21/44008; H04N 21/45455; H04N 21/4725; H04N 21/4788; H04N 21/4821; H04N 21/8146; H04N 21/835;
(Continued)

(56) References Cited

U.S. PATENT DOCUMENTS 5,963,246 A * 10/1999 Kato ...................... H04N 7/152
                                                          348/14.09
7,061,521 B2 * 6/2006 Bulriss .................. H04N 7/147
                                                          348/14.09

(Continued)

OTHER PUBLICATIONS

"US Application", U.S. Appl. No. 17/706,730, filed Mar. 29, 2022.

(Continued)

*Primary Examiner* — Gerald Gauthier
(74) *Attorney, Agent, or Firm* — Haley Guiliano LLP

(57) ABSTRACT

Systems and methods are provided herein for only including portions of a user's environment that have been approved by a user in a video conference while excluding portions that have not been approved. This may be accomplished by a device receiving a policy identifying one or more approved objects of a scene of a video stream. The device may then generate a filtered video stream by only including portions of the scene that comprise the one or more objects that were approved by the policy in the filtered video stream. The filtered video stream may be combined with other video streams to generate a video conference that is transmitted and/or stored by one or more devices participating in the video conference.

19 Claims, 13 Drawing Sheets

(51) Int. Cl.
    *G06T 5/70*           (2024.01)
    *G06T 17/00*         (2006.01)
    *G06V 40/20*         (2022.01)

(52) U.S. Cl.
    CPC ............ *G06V 40/20* (2022.01); *H04N 7/155* (2013.01); *G06V 2201/07* (2022.01)

(58) Field of Classification Search
    CPC .. H04N 21/858; H04N 7/141; H04N 21/2347; H04W 12/02
    See application file for complete search history.

(56) References Cited

U.S. PATENT DOCUMENTS

| | | | |
|---|---|---|---|
| 7,227,567 B1 | 6/2007 | Beck et al. | |
| 7,468,738 B2* | 12/2008 | Barreiro | H04N 7/15 348/E7.083 |
| 7,474,326 B2* | 1/2009 | Le Pennec | H04N 21/2347 348/14.09 |
| 8,063,929 B2* | 11/2011 | Kurtz | H04N 7/147 348/14.09 |
| 8,117,638 B2* | 2/2012 | Perlman | H04N 21/4821 725/31 |
| 8,144,182 B2* | 3/2012 | Shoemake | H04N 21/4788 348/14.09 |
| 8,159,519 B2* | 4/2012 | Kurtz | H04N 7/147 348/14.08 |
| 8,525,867 B2* | 9/2013 | Kim | H04L 12/1818 370/395.2 |
| 8,754,924 B1* | 6/2014 | Shane | H04N 7/15 348/14.05 |
| 9,003,552 B2 | 4/2015 | Goodwin et al. | |
| 9,532,005 B2* | 12/2016 | Shamoon | H04N 21/835 |
| 10,051,253 B1* | 8/2018 | Monastyrshyn | G06V 10/28 |
| 10,102,634 B1* | 10/2018 | Poliakov | G06V 10/255 |
| 10,360,457 B2* | 7/2019 | Meisser | H04N 7/15 |
| 11,082,731 B1* | 8/2021 | Cox | H04N 21/2393 |
| 11,233,974 B1* | 1/2022 | Adcock | H04N 7/157 |
| 11,303,848 B2 | 4/2022 | Matula et al. | |
| 11,475,667 B2* | 10/2022 | Yakupov | G06V 20/46 |
| 11,665,316 B2* | 5/2023 | Decrop | G06T 5/70 348/14.08 |
| 11,671,561 B1 | 6/2023 | Chang et al. | |
| 11,683,446 B2* | 6/2023 | Han | H04L 12/1822 348/14.09 |
| 11,785,180 B2* | 10/2023 | Peters | H04N 7/147 348/14.09 |
| 2004/0236830 A1 | 11/2004 | Nelson et al. | |
| 2005/0157164 A1* | 7/2005 | Eshkoli | H04N 7/152 348/14.09 |
| 2005/0243192 A1* | 11/2005 | Allman | G06T 7/215 348/239 |
| 2008/0030590 A1* | 2/2008 | Ciudad | H04N 7/147 348/211.12 |
| 2008/0062252 A1* | 3/2008 | Kawamura | H04N 5/2624 348/E5.053 |
| 2008/0297588 A1* | 12/2008 | Kurtz | H04N 7/147 348/E7.083 |
| 2010/0066808 A1* | 3/2010 | Tucker | H04L 12/1827 348/14.09 |
| 2010/0315484 A1* | 12/2010 | Ramanathan | H04N 7/15 348/E7.083 |
| 2012/0050323 A1 | 3/2012 | Baron, Jr. et al. | |
| 2012/0327172 A1 | 12/2012 | El-Saban et al. | |
| 2014/0267550 A1* | 9/2014 | Nimri | H04N 7/152 348/14.09 |
| 2014/0267577 A1* | 9/2014 | Weber | H04L 65/4046 348/14.09 |
| 2014/0313282 A1* | 10/2014 | Ma | H04N 7/141 348/14.09 |
| 2017/0148487 A1* | 5/2017 | Krishnakumar | G11B 27/031 |
| 2017/0262994 A1* | 9/2017 | Kudriashov | G06T 7/90 |
| 2017/0289623 A1 | 10/2017 | Bailey et al. | |
| 2019/0045207 A1* | 2/2019 | Chen | G06F 16/951 |
| 2019/0075236 A1* | 3/2019 | Cheung | G06T 7/90 |
| 2019/0238952 A1* | 8/2019 | Boskovich | H04N 21/858 |
| 2020/0228880 A1* | 7/2020 | Iyer | H04N 21/251 |
| 2021/0049770 A1* | 2/2021 | Ford | G06F 18/211 |
| 2021/0174118 A1* | 6/2021 | Chhabra | G06V 20/635 |
| 2021/0227271 A1* | 7/2021 | Cox | H04N 21/234318 |
| 2022/0350925 A1* | 11/2022 | Alexander | H04W 12/02 |
| 2023/0231971 A1* | 7/2023 | Davidson | H04L 12/1822 348/14.08 |
| 2023/0351727 A1* | 11/2023 | Balavalikar Krishnamurthy | H04N 5/2628 |
| 2024/0064266 A1 | 2/2024 | Hosangadi et al. | |
| 2024/0127853 A1* | 4/2024 | Smith | G11B 19/18 |
| 2024/0146877 A1* | 5/2024 | Geddes | H04N 21/4725 |
| 2024/0259451 A1* | 8/2024 | Carluccio | H04N 7/152 |
| 2024/0333873 A1* | 10/2024 | Gehrmann | G06T 5/20 |
| 2024/0333874 A1* | 10/2024 | Gehrmann | G06T 5/20 |

OTHER PUBLICATIONS

"US Application", U.S. Appl. No. 17/706,737, filed Mar. 29, 2022.
"US Application", U.S. Appl. No. 18/120,128, filed Mar. 10, 2023.
"US Application", U.S. Appl. No. 18/120,130, filed Mar. 10, 2023.
"US Application", U.S. Appl. No. 18/120,131, filed Mar. 10, 2023.
Hasan, Rakibul , R. Hasan, "A socio-technical approach to protecting people's privacy in the context of images on social media", PhD thesis, Indiana University, 2020.
Jain, Ankit Kumar, et al., "Online social networks security and privacy: comprehensive review and analysis", A.K. Jain, et al., "Online social networks security and privacy: comprehensive review and analysis", Complex Intell. Syst. 7, pp. 2157-2177, 2021.
Paci, Federica , et al., "Survey on Access Control for Community-Centered Collaborative Systems", F. Paci, A. Squicciarini, and N. Zannone, "Survey on Access Control for Community-Centered Collaborative Systems", ACM Comput. Surv. 51, 1, Article 6, Jan. 2019.
Sun, Yuanyi , et al., Y. Sun, S. Zhu and Y. Chen, "ZoomP: Privacy-Preserving Publishing of Online Video Conference Recordings", Proceedings on Privacy Enhancing Technologies, No. 3, pp. 630-649, 2022.
Venkateswarulu, N. , et al., "Filtering Unwanted Multimedia Messages from Online Social Network User Walls", N. Venkateswarulu and J. Divya. "Filtering Unwanted Multimedia Messages from Online Social Network User Walls", International journal of engineering research and technology. No. 3, 2014.
Wang, Xiaogang , X. Wang, Deep Learning in Object Recognition, Detection, and Segmentation, now, 2016.

* cited by examiner

300

| Object Information | Action |
|---|---|
| $\{(F_{11},P_{11}), (F_{12},P_{12}),\ldots, (F_{1n1},P_{1n1})\}$ | Clear |
| $\{(F_{21},P_{21}), (F_{22},P_{22}),\ldots, (F_{2n1},P_{2n1})\}$ | Avatar1 |
| $\{(F_{31},P_{31}), (F_{32},P_{32}),\ldots, (F_{3n1},P_{3n1})\}$ | Blur |
| $\{(F_{41},P_{41}), (F_{42},P_{42}),\ldots, (F_{4n1},P_{4n1})\}$ | Exclude |
| $\{(F_{51},P_{51}), (F_{52},P_{52}),\ldots, (F_{5n1},P_{5n1})\}$ | Exclude |
| $\{(F_{61},P_{61}), (F_{62},P_{62}),\ldots, (F_{6n1},P_{6n1})\}$ | Exclude |
| .... | .... |
| $\{(F_{k1},P_{k1}), (F_{k2},P_{k2}),\ldots, (F_{kn1},P_{kn1})\}$ | Exclude |

FIG. 3

PRIVACY PRESERVING ONLINE VIDEO CAPTURING AND RECORDING

BACKGROUND

Aspects of the present disclosure relate to video conferencing, and in particular to techniques for providing enhanced privacy to users during video conferencing. As explained in the detailed description, some disclosed embodiments or aspects relate to other features, functionalities, or fields.

SUMMARY

Advancements in communication technology have improved the ability of users to communicate with colleagues, family, and friends located in different physical locations than the user. For example, conferencing systems (e.g., Microsoft® Teams, Skype®, Zoom™, etc.) may be used to host online video meetings, with parties joining virtually from around the world. Such video meetings enable colleagues in separate, geographically distributed physical locations to have a collaborative face-to-face conversation via a video conference, even if one or more of such users are on the go (e.g., utilizing a smartphone or a tablet). As another example, some social network platforms (e.g., Snapchat®, TikTok®, Instagram®, Facebook®, etc.) allow a user to share a recorded video with other users or live stream a video.

Recently, the COVID-19 pandemic led to employees working remotely on an unprecedented, massive scale. When millions of companies went fully remote during this time, video conferencing became the logical solution for connecting the remote workforce and keeping teams productive from home. In a matter of weeks, video conferencing usage exploded, permeating nearly all aspects of professional and personal life. In addition to business-related meetings, people around the globe are using video conferencing to host virtual happy hours, ice breaker activities, online games, wine tastings, birthday parties, and other social activities. Although video conferencing provides increased flexibility there are a number of privacy concerns. For example, many users do not wish for certain objects and/or people in the vicinity of the users to be shared with video conference participants.

In some instances, this problem may be addressed using methodologies that involve identifying sensitive parts of a video stream and either removing or obfuscating the sensitive parts of the video stream. For example, a system may receive images of user's surroundings to generate a video for a video conference. The images may comprise information regarding sensitive objects (e.g., checkbooks, children, etc.). The system may use advanced learning recognition methods to identify the sensitive objects and remove them from the video conference. However, most of these types of methodologies are post-processing solutions that require the video conference (containing the sensitive objects) to be stored immediately on a server and then reprocessed to remove the sensitive objects. This results in a privacy risk as users may not want the video conference containing sensitive information to be stored on a server. Further, most of these types of methodologies are based on blacklisting. Blacklisting is the process of removing objects, identified by the user, from a video conference. For example, a user may blacklist a first person (e.g., a first child) that is in the vicinity of the user and the system removes the first person from the video conference. However, blacklisting may be poorly suited for unknown objects that were not previously identified by the system. For example, a user may not want their children shown in a video conference. The user may blacklist a first person (e.g., a first child) that is in the vicinity of the user and the system will remove the first person from the video conference. If a second, unanticipated, person (e.g., a second child) walks into the vicinity of the user during the video conference, then the system may include the second person in the video conference due to the second person not matching the previously blacklisted subject (e.g., the first child). In such an example, the second child is shown on the video conference despite the user wanting to protect the privacy of the second child. Accordingly, there exists a need for enhanced privacy options for video conference users.

Accordingly, techniques are disclosed herein for only including portions of a user's environment that have been approved by a user in a video conference while excluding portions not approved. For example, a first device (e.g., smartphone, laptop, desktop, tablet, etc.) may receive an input from a first user corresponding to a first policy. The first policy may indicate one or more object identifiers and one or more corresponding actions. An object identifier may be any suitable information used by a device to identify an object when generating a video conference. For example, the object identifier may correspond to a set of object features related to a family picture. The one or more actions may define display actions corresponding to the one or more object identifiers when generating a video conference. For example, the one or more actions may include: displaying the identified object without modifications, blurring the identified object, morphing the identified object, replacing the identified object with an avatar, replacing the identified object with text, and/or similar such actions. The first policy can be used to generate a video conference with enhanced privacy.

As a first example, in an embodiment, the first device may transmit metadata indicating the first policy along with a first video stream to a second device (e.g., a server). The first device may generate the first video stream using a plurality of images, wherein the plurality of images comprises the first user and the area around the first user. The first policy may identify a first object (e.g., first user) and a second object (e.g., family picture). The first policy may also comprise a first action (e.g., display without modification) corresponding to the first object and a second action (e.g., blur) corresponding to the second object. The second device may receive the first video stream and may generate a first filtered video stream using the first policy and first video stream. For example, the second device may modify the first video stream to display the first user without modification and blur the family picture. The second device may exclude any objects that were not identified by the first policy when generating the first filtered video stream. For example, if the video stream comprises the first object (e.g., first user), the second object (e.g., family picture), and a third object (e.g., table), then the second device excludes the third object in the first filtered video stream because the third object was not identified by the first policy. The second device may repeat this process for a plurality of video streams received from devices participating in a video conference. For example, a third device may transmit a second policy along with a second video stream. The second device may use the second policy and the second video stream to generate a second filtered video stream. The second device may merge a plurality of filtered video streams to create a merged video stream and then transmit the merged video stream to the devices (e.g., first device, third device, etc.) participating in the video conference.

As a second example, in an embodiment, a first device may (e.g., rather than transmitting, to a device, a video stream and data representing the first policy) generate, based on the first policy, a first filtered video stream. For example, the first policy may identify a first object (e.g., first user) and a second object (e.g., family picture). The first policy may comprise a first action (e.g., display without modification) corresponding to the first object and a second action (e.g., blur) corresponding to the second object. The first device may generate the first video stream using a plurality of images, wherein the plurality of images comprises the first user and the area around the first user. The first device may then generate a first filtered video stream using the first policy. For example, the first device may display the first user without modification and blur the family picture. The first device may exclude any objects that were not identified by the first policy when generating the first filtered video stream. For example, if the plurality of images comprises the first object (e.g., first user), the second object (e.g., family picture), and a third object (e.g., table), then the first device excludes the third object in the first filtered video stream because the third object was not identified by the first policy. The first device may then send the first filtered video stream to a second device (e.g., a server) where the first filtered video stream is stored. The second device may receive a plurality of different filtered streams from a plurality of devices participating in a video conference. For example, the second device may store a first filtered video stream corresponding to a first device and a second filtered video stream corresponding to a third device. In some embodiments, the second device merges a plurality of filtered video streams to create a merged video stream. The second device may then send the merged video stream to the devices (e.g., first device, third device, etc.) participating in the video conference.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 3 shows an illustrative privacy policy table, in accordance with some embodiments of this disclosure.

DETAILED DESCRIPTION

Figure 1A:
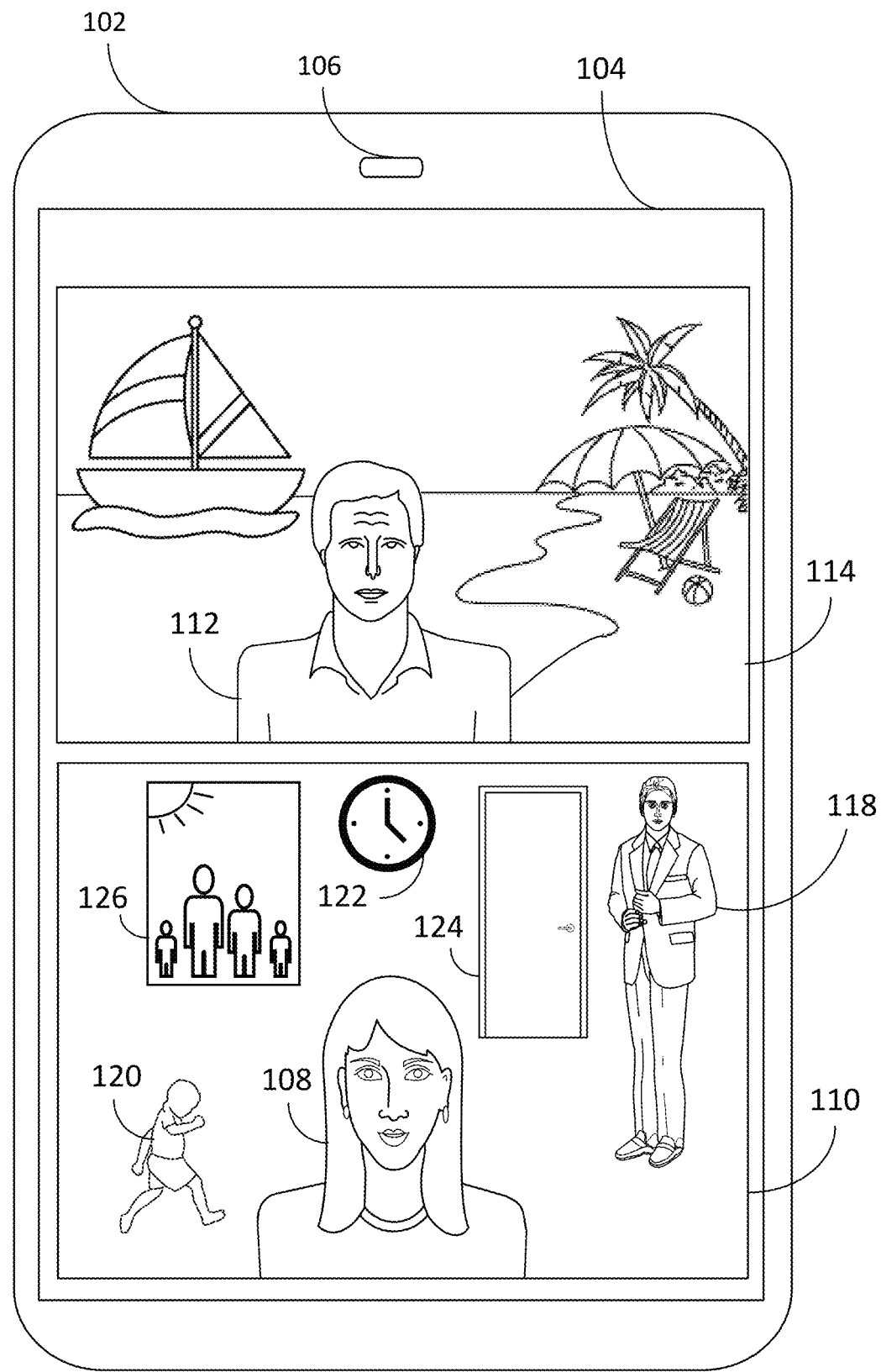
FIGS. 1A-1D show illustrative diagrams of a system for enabling user-controlled privacy settings during video conferencing, in accordance with some embodiments of this disclosure.
Figure 1B:
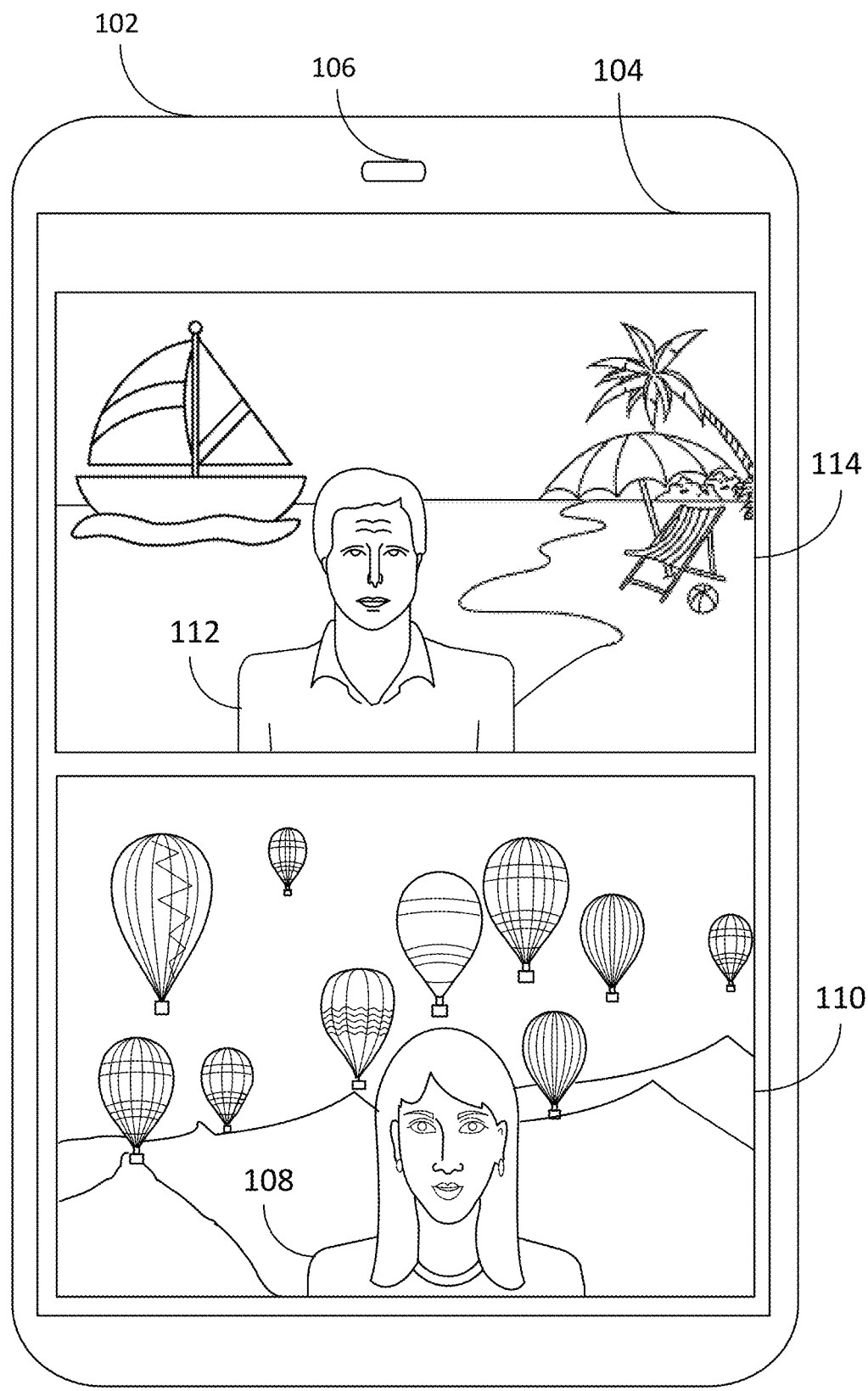

FIGS. 1A-D show illustrative diagrams of a system for enabling user-controlled privacy settings during video conferencing, in accordance with some embodiments of the disclosure. The system includes a user device 102 with a display 104 and a camera 106. The user device 102 may be a mobile device such as a smartphone or tablet, a laptop, a desktop computer, a smart watch or wearable device, smart glasses, a stereoscopic display, a wearable camera, AR glasses, an AR head-mounted display (HMD), a virtual reality (VR) HMD and/or any other device suitable for video conferencing. A video conference application may be configured to establish a video conference over a network with one or more other users. The video conference application may be configured to be executed at least in part on user device 102 and/or at one or more other user devices participating in the video conference, and/or at one or more remote servers. In some embodiments, the term video conferencing can mean audio and/or video conferencing. In some embodiments, the display 104 displays a user interface for the video conferencing. In some embodiments, the user interface shows a first user 108 in a first section 110 of the display 104 and a second user 112 in a second section 114 of the display 104. Although two sections are shown, any number of sections may be used. Further, the sections are not required to be the same size or shape. Although two users are shown any number of users may take part in the described video conference. Further, not all of the users in the video conference need to be shown by the user interface. In some embodiments, only certain users (e.g., users who are speaking and/or have spoken recently, presenters, users transmitting video data, etc.) are displayed.

In some embodiments, the user device 102 is associated with the first us 108. For example, the user device 102 may use the camera 106 to capture one or more images of a first scene and then use the one or more images to generate the first section 110 of the display 104. The user device 102 may use the one or more images of the first scene to generate a first video stream comprising the first scene. The video stream (e.g., as virtually displayed by the first section 110) may comprise one or more objects (e.g., first user 108, adult 118, child 120, clock 122, door 124, picture 126, etc.). The user device 102 may be configured to detect the presence of, classify, and/or localize such one or more objects. In some embodiments, the user device 102 uses data received from one or more sensors (e.g., camera 106) to identify the one or more objects in the first scene. For example, the user device 102 may extract a plurality of features from the one or more images captured by the camera 106. The user device 102 may use the plurality of features to identify the one or more objects in the first scene. In some embodiments, the user device 102 uses one or more techniques (e.g., feature matching) to determine that a set of features of the plurality of features relates to an object. For example, a first set of features of the plurality of features may relate to the first user 108 and a second set of features of the plurality of features may relate to the adult 118. In some embodiments, one or more of the processing steps described herein are performed by a device other than the user device 102. For example, the user device 102 may capture the images and transmit the images to a trusted device (e.g., edge server), where the data is processed.

In some embodiments, the user device 102 uses the plurality of features to identify the one or more objects. For example, the user device 102 may use an identification algorithm to identify the first user 108 as a first object and the adult 118 as a second object. The user device 102 may receive an input from the first user 108 corresponding to a first policy. For example, the first user 108 may select a first object (e.g., first user 108) and an action (e.g., display without modification) corresponding to the first object. The action may define display actions corresponding to the first object when generating a video conference. For example, the first policy selected by the user 108 may indicate that the first object (e.g., first user 108) may be displayed without modification when generating the video conference. In some embodiments, the first policy comprises the plurality of features and/or information relating to the plurality of features corresponding to one or more objects identified by the policy. For example, the first policy may comprise the first set of features corresponding to the first user 108.

In some embodiments, the user device 102 transmits the video stream of the first video stream captured by the camera 106 and the first policy selected by the first user 108 to a second device (e.g., remote server, different user device, edge server, etc.). For example, the user device 102 may transmit the first video stream and metadata indicating the first policy to a server hosting the video conference. The second device may generate a first filtered video stream using the first policy and the first video stream. In some embodiments, the second device generates the first filtered video stream by only including portions of the first video stream that comprise the identified object in the first filtered video stream. For example, the second device may modify the first video stream to display only the first user 108. In some embodiments, the second device generates the first filtered video stream by excluding any objects (e.g., adult 118, child 120, clock 122, door 124, picture 126) that were not identified by the first policy when generating the first filtered video stream. In some embodiments, the second device uses a combination of including and excluding when generating the first filtered video stream. In some embodiments, the first section 110 of FIG. 1B displays an example of a first filtered video stream. As displayed by the first section 110 of FIG. 1B, only the first object (e.g., first user 108) identified by the first policy is displayed. Further, the action (e.g., display without modification) indicated by the first policy is applied to the first object.

In some embodiments, the second device further modifies the first filtered video stream by including a virtual background. For example, the second device may replace the excluded portions of the first video stream with a virtual background comprising balloons and a mountainous landscape as displayed by the first section 110 of FIG. 1B. The virtual background may depict any suitable image or video or animation simulating an environment desired by a particular user. In some embodiments, the virtual background displayed the first section 110 of FIG. 1B may be selected by the first user 108 from among a plurality of virtual backgrounds provided by the video conference application and/or user device 102. In some embodiments, the first user 108 uploads an image for use as a virtual background or imports virtual backgrounds from any suitable source.

The second device may repeat this process of generating a filtered video stream for a plurality of video streams received from devices participating in a video conference. For example, a third device corresponding to the second user 112 may transmit a second policy (e.g., display the second user 112 without modification) along with a second video stream. The second device may use the second policy and the second video stream to generate a second filtered video stream. For example, the second device may modify the second video stream to display the second user 112 without modification. The second device may exclude any objects that were not identified by the second policy when generating the second filtered video stream. The second device may also insert a second virtual background (e.g., beach environment).

In some embodiments, the second device transmits the filtered video streams to devices participating in the video conference. For example, the second device may transmit the second filtered video stream corresponding to the second user 112 to the user device 102. The user device 102 may display the second filtered video stream in the second section 114. In some embodiments, the second device merges a plurality of filtered video streams to create a merged video stream and then transmits the merged video stream to the devices (e.g., first device, third device, etc.) participating in the video conference. In some embodiments, FIG. 1B displays the user device 102 displaying the merged video stream received from the second device.

The first user 108 may update the first policy at any time during the video conference. For example, the first user 108 may update the first policy by selecting a second object (e.g., adult 118), a second action (e.g., insert avatar), a third object (e.g., child 120) and a third action (e.g., blur) in addition to the first object (e.g., first user 108) and the first action (e.g., display without modification). In some embodiments, the updated policy comprises the plurality of features and/or information relating to the plurality of features corresponding to the objects identified by the updated policy. For example, the updated policy may comprise the first set of features corresponding to the first user 108, a second set of features corresponding to the adult 118, and a second set of features corresponding to the child 120. In some embodiments, the user device 102 transmits the updated policy to the second device and the second device uses the updated policy when generating subsequent segments of the filtered video streams. For example, the second device may modify the subsequent segment of the first video stream received from the first device 102 to display the first user 108 without modification, replace the adult 118 with an avatar 128, and blur the child 120. The second device may exclude any objects (e.g., clock 122, door 124, and/or picture 126) that were not identified by the updated policy when generating subsequent segments of the first filtered video stream. In some embodiments, the first section 110 of FIG. 1C displays an example of a subsequent segment of the first filtered video stream. As displayed by the first section 110 of FIG. 1C, only the objects (e.g., first object, second object, and third object) identified by the updated policy are displayed. Further, the actions (e.g., first action, second action, and third action) indicated by the updated policy are applied.

In some embodiments, the user device 102 generates the first filtered video stream rather than transmitting, to the second device, the video stream and data representing the first policy. For example, the user device 102 may modify the first video stream to display the first user 108 without modification. In some embodiments, the user device 102 generates the first filtered video stream by only including portions of the first video stream that comprise the identified object in the first filtered video stream. For example, the second device may modify the first video stream to display only the first user 108. In some embodiments, the user device 102 generates the first filtered video stream by excluding any objects (e.g., adult 118, child 120, clock 122, door 124, picture 126) that were not identified by the first policy when generating the first filtered video stream. In some embodiments, the user device 102 uses a combination of including and excluding when generating the first filtered video stream. In some embodiments, the first section 110 of FIG. 1B displays an example of the first filtered video stream. As displayed by the first section 110 of FIG. 1B, only the first object (e.g., first user 108) identified by the first policy is displayed. Further, the action (e.g., display without modification) indicated by the first policy is applied to the first object. The user device 102 may also replace the excluded portions of the first video stream with a virtual background in the same or similar manner as described above. The user device 102 may then transmit the first filtered video stream to one or more devices. For example, the user device 102 may transmit the first filtered video stream to a server hosting the video conference. In such an example, the server may merge a plurality of filtered video streams received from devices participating in the video conference to create a merged video stream and then transmit the merged video stream to the devices participating in the video conference. In some embodiments, the first section 110 of FIG. 1B displays the user device 102 displaying the merged video stream received from the server. In another example, the user device 102 may transmit the first filtered video stream to other devices (e.g., device corresponding to the second user 112) participating in the video conference.

The first policy may be updated at the user device 102 using the same or similar methodologies described above. For example, the user device 102 may receive an updated policy from the first user 108. The user device 102 may modify subsequent segments of the first video stream according to the updated policy when generating the first filtered video stream. For example, the user device 102 may modify the subsequent segments of the first video stream to display the first user 108 without modification, replace the adult 118 with an avatar 128, and blur the child 120. The user device 102 may exclude any objects (e.g., clock 122, door 124, and/or picture 126) that were not identified by the updated policy when generating the subsequent segments of the first filtered video stream. In some embodiments, the first section 110 of FIG. 1C displays an example of subsequent segments of the first filtered video stream. As displayed by the first section 110 of FIG. 1C, only the objects (e.g., first object, second object, and third object) identified by the updated policy are displayed. Further, the actions (e.g., first action, second action, and third action) indicated by the updated policy are applied.

Information collected by one or more devices participating in a video conference may sometimes be recorded and stored. For example, the first user 108 may want to rewatch segments of the video conference at a later time. In some embodiments, the stored video conference is transmitted in real time (e.g., live-streamed) to one or more devices participating in the video conference. In some embodiments, the stored video conference is transmitted at a later time to one or more device and/or posted to any suitable website or application (e.g., a social network, video sharing website application, etc.) for consumption.

In some embodiments, the video conference is stored at the second device. For example, the second device may be a central host server connected to a central media router. In another example, the second device may be an edge server (e.g., distributed media router) associated with the user device 102. In some embodiments, the video conference is stored by one or more devices. For example, a first edge server associated with the user device 102 may store the video conference and a second edge server associated with the second user 112 may also store the video conference. In another example, the user device 102 may store the video conference and a second user device associated with the second user 112 may also store the video conference. In some embodiments, the video conference is stored at the same device that generates the merged video stream. For example, if a central host server generates the merged video stream then the central host server stores the merged video stream as the video conference. In another example, if the user device 102 generates the merged video stream, then the user device 102 stores the merged video stream as the video conference.

In some embodiments, the stored video conference can be updated after storage. For example, the video conference may be stored on the second device. The second device may receive a storage update request from the user device 102. The storage update request may indicate one or more objects to remove or modify from the stored video conference. For example, the second device may store a video conference comprising the first filtered video stream displayed in the first section 110 of FIG. 1C. The received update request may indicate that the avatar 128 corresponding to the second object (e.g., adult 118) and the third object (e.g., child 120) are to be removed from the stored video conference. The second device may then remove the avatar 128 corresponding to the second object (e.g., adult 118) and the third object (e.g., child 120) from the stored video conference. If a user (e.g., first user 108) subsequently views the stored video conference, the avatar 128 corresponding to the second object (e.g., adult 118) and the third object (e.g., child 120) are no longer stored so they are not displayed. For example, the updated stored video conference may resemble the first section 110 of FIG. 1B where the second object (e.g., adult 118) and third object (e.g., child 120) are removed and the first object (e.g., first user 108) is displayed. In some embodiments, the storage update request may be the same and/or part of an updated policy received from the user device 102. In some embodiments, objects can only be removed or modified from the stored video conference because the second device stores objects identified by the received policies and does not store information related to objects not identified by the received policies.

The stored video conference may be updated at the user device 102 using the same or similar methodologies described above. For example, the user device 102 may receive a storage update request from the first user 108. The storage update request may indicate one or more objects to be removed or modified from the stored video conference. For example, the user device 102 may store a video conference comprising the first filtered video stream displayed in the first section 110 of FIG. 1C. The received update request may indicate that the avatar 128 corresponding to the second object (e.g., adult 118) and the third object (e.g., child 120) are to be removed from the stored video conference. The user device 102 may remove the avatar 128 corresponding to the second object (e.g., adult 118) and the third object (e.g., child 120) from the stored video conference. If a user (e.g., first user 108) subsequently views the stored video conference, the avatar 128 corresponding to the second object (e.g., adult 118) and the third object (e.g., child 120) are no longer stored so they are not displayed. For example, the updated stored video conference may resemble the first section 110 of FIG. 1B where the second object (e.g., adult 118) and third object (e.g., child 120) are removed and the first object (e.g., first user 108) is displayed.

Figure 1C:
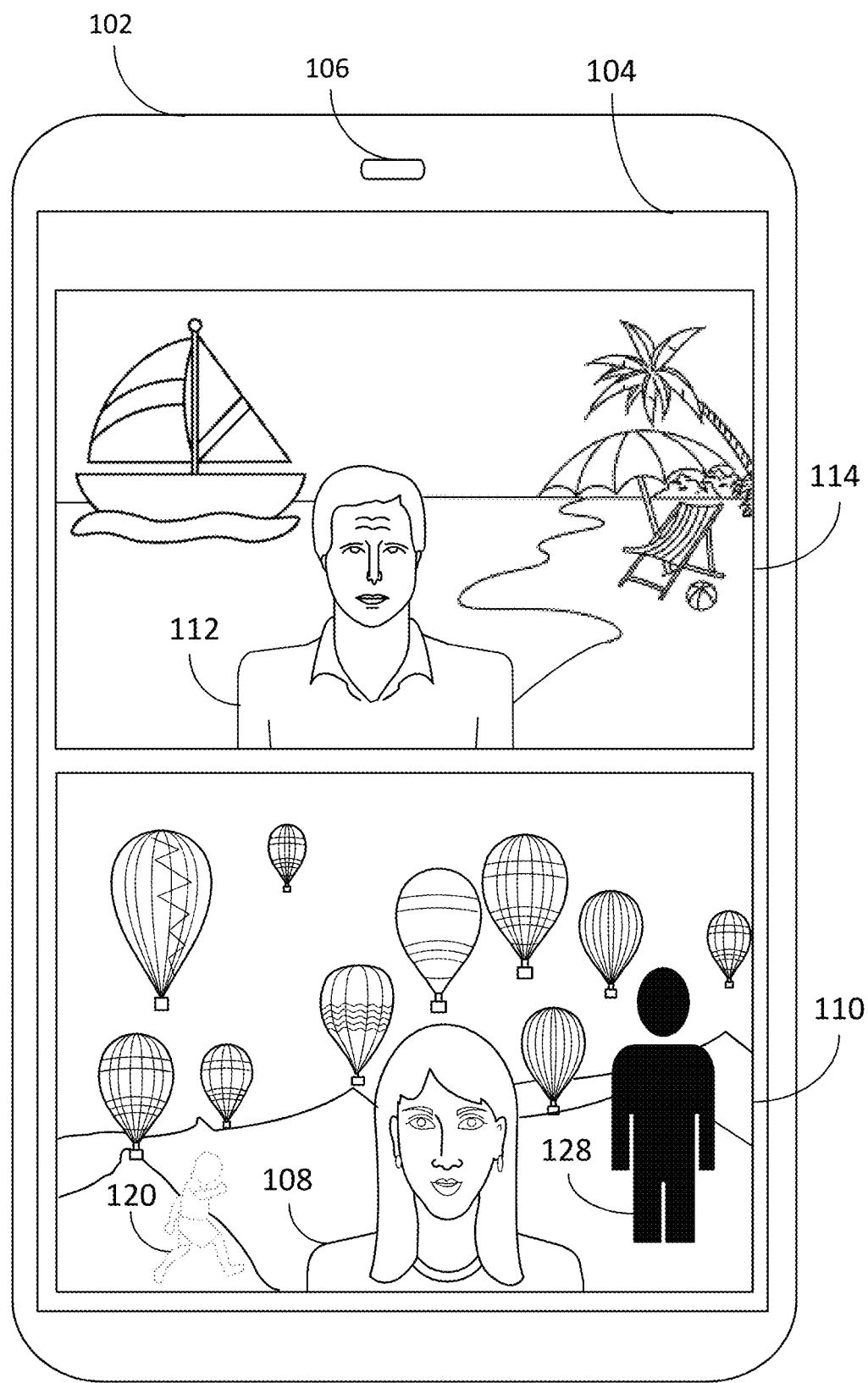
Figure 1D:
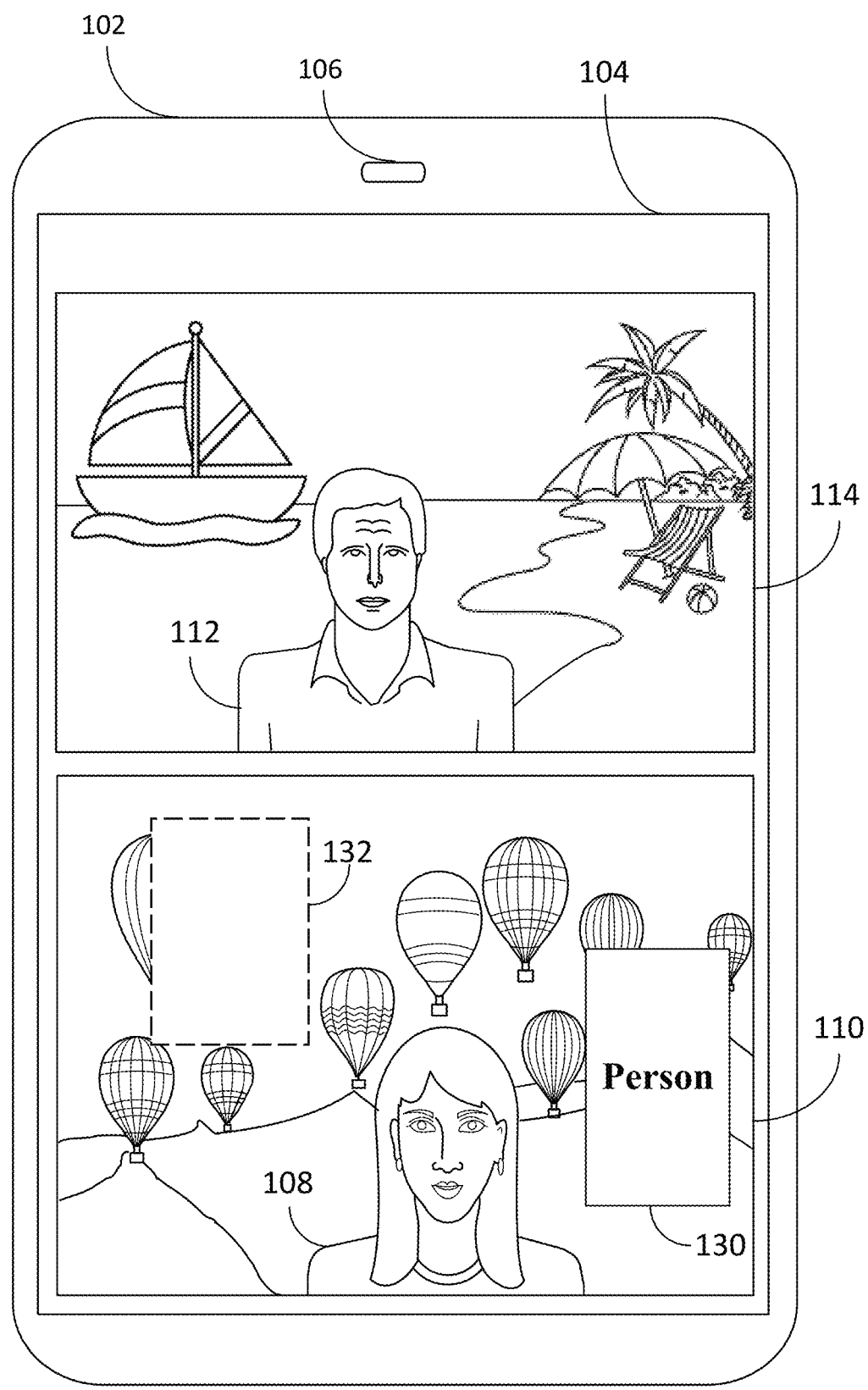

In some embodiments, a device (e.g., second device, user device 102, etc.) generating the first filtered video stream may insert an extended reality (XR) portion or XR element (e.g., avatar 128) according to a received policy as displayed in the first section 110 of FIG. 1C. XR may be understood as virtual reality (VR), augmented reality (AR) or mixed reality (MR) technologies, or any suitable combination thereof. In some embodiments, the avatar 128 is selected by the first user 108 from among a plurality of avatar provided by the video conference application and/or user device 102. In some embodiments, the avatar 128 is automatically scaled to dimensions similar to dimensions of the object (e.g., adult 118) that the avatar 128 is replacing.

The device may employ any suitable technique to perform insertion of an XR portion (e.g., avatar 128). For example, the user device 102 may employ image segmentation (e.g., semantic segmentation and/or instance segmentation) and classification to identify and localize different types or classes of entities in frames of a video stream. Such segmentation techniques may include determining which pixels belong to a depiction of the first user 108, and/or which pixels should be mapped to a particular facial feature (e.g., head, nose, ear, eyes, shoulder, mouth, etc.) or any other suitable feature of the first user 108. Such segmentation techniques may include determining which pixels belong to the physical environment surrounding the first user 108. Such segmentation techniques may include determining which pixels belong to other object within the physical environment, such as, for example, other users, animals etc. In some embodiments, segmentation of a foreground and a background of the video stream may be performed. The user device 102 may identify a shape of, and/or boundaries (e.g., edges, shapes, outline, border) at which, depiction of the first user 108 ends and/or analyze pixel intensity or pixel color values contained in frames of the video stream. The user device 102 may label pixels as belonging to the depiction of the first user 108 or the actual physical background, to determine the location and coordinates at which XR portion (e.g., avatar 128) may be inserted into the video stream, using any suitable technique. For example, the user device 102 may employ machine learning, computer vision, object recognition, pattern recognition, facial recognition, image processing, image segmentation, edge detection, or any other suitable technique or any combination thereof. Additionally, or alternatively, the user device 102 may employ color pattern recognition, partial linear filtering, regression algorithms, and/or neural network pattern recognition, or any other suitable technique or any combination thereof.

In some embodiments, the first user 108 may select a policy that replaces one or more objects with text and/or virtual objects. For example, the first user 108 may select a first object (e.g., first user 108), a first action (e.g., display without modification), a second object (e.g., adult 118), a second action (e.g., replace with text), a third object (e.g., picture 126), and a third action (e.g., replace with virtual object). In some embodiments, the policy comprises the plurality of features and/or information relating to the plurality of features corresponding to the objects identified by the policy. For example, the policy may comprise a first set of features corresponding to the first user 108, a second set of features corresponding to the adult 118, and a third set of features corresponding to the picture 126. In some embodiments, the policy is used to generate the first filtered video stream displayed in the first section 110 of FIG. 1D. For example, the first video stream may be modified to display the first user 108 without modification, to replace the adult 188 with text 130, and to replace the picture 126 with a virtual object 132. In some embodiments, the text 130 is inputted by the first user 108. In some embodiments, the text 130 is determined by the video conference application by classifying the object (e.g., adult 118) being replaced by the text. In some embodiments, the virtual object 132 is selected by the first user 108 from a plurality of virtual objects. In some embodiments, the virtual object 132 is generated to share one or more dimensions with the object (e.g., picture 126) being replaced. For example, the virtual object 132 may have the same width and/or height as the picture 126.

In some embodiments, the video conference may be hosted by one or more remote servers. In some embodiments, the video conference can be scheduled for a particular time or spontaneously created at the request of a user (e.g., first user 108), with any suitable number of participants. In some embodiments, each user may access the video conference via a connected device (e.g., user device 102) accessing one or more of a web address or virtual room number, e.g., by entering his or her username and password. In some embodiments, one or more users may be a moderator or host, where a designated moderator may have the task of organizing the meeting and/or selecting the next participant member to speak or present.

In some embodiments, video and audio feeds associated with the respective video conference participants may be transmitted separately during the video conference along with a header or metadata. Such header or metadata may enable synchronization of the audio and video feed at the destination device, or audio and video data may be combined as a multimedia data stream. In some embodiments, the metadata comprises policy information about the related video stream. In some embodiments, any suitable audio or video compression and/or encoding techniques may be utilized. Such techniques may be employed prior to transmitting the audio and/or video components of the video stream from the user device 102 to a server or other device. In some embodiments, at least a portion of such video compression and/or encoding may be performed as one or more remote servers (e.g., an edge server and/or any other suitable server). In some embodiments, the receiving or rendering device (e.g., user device 102) may perform decoding of the video and/or audio feeds or multimedia data stream upon receipt, and/or at least a portion of the decoding may be performed remote from the receiving device. In some embodiments, the first user 108 and second user 112 may be located in different geographical locations, and the video conference may be assigned, a unique video conference identifier.

Figure 2:
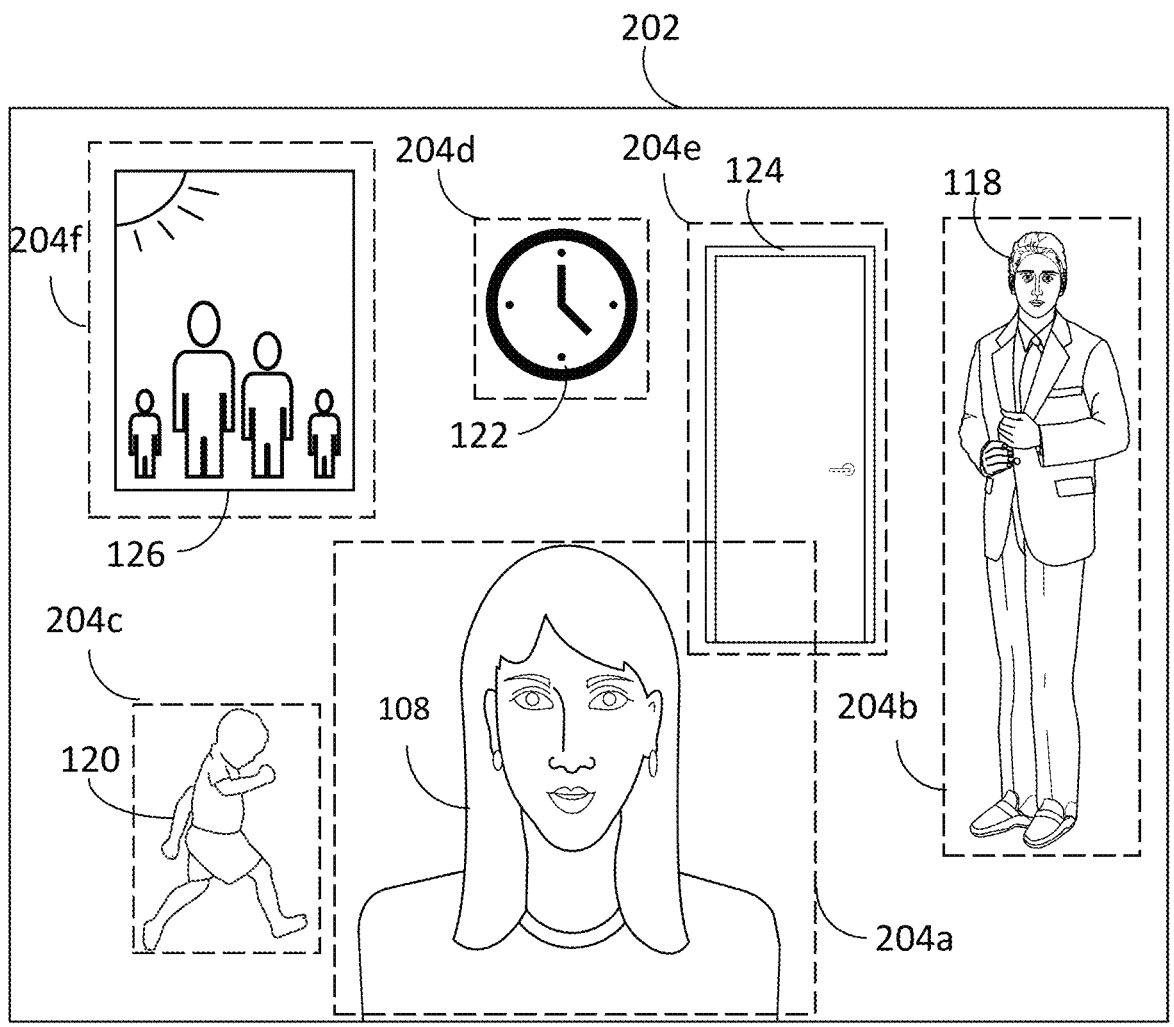
FIG. 2 shows an illustrative privacy setting user interface, in accordance with some embodiments of this disclosure.

FIG. 2 shows an illustrative privacy setting user interface 200, in accordance with some embodiments of this disclosure. In some embodiments, the privacy setting user interface 200 is displayed on a display 202 of a user device (e.g., user device 102). In some embodiments, the privacy setting user interface 200 is displayed for the user (e.g., first user 108) of the user device (e.g., user device 102) before, during, and/or after a video conference. For example, the user device 102 may display the privacy setting user interface 200 prior to transmitting a first video stream for a video conference. In some embodiments, the privacy setting user interface 200 displays the first video stream and/or a preview of the first video stream. For example, the privacy setting user interface 200 may display a scene comprising one or more objects (e.g., first user 108, adult 118, child 120, clock 122, door 124, picture 126, etc.). In some embodiments, the privacy setting user interface 200 displays one or more object identifiers 204a-204f corresponding to the one or more objects in the scene. Although the one or more object identifiers 204a-204f are displayed as rectangles any such shape may be used.

In some embodiments, the video conference application may be configured to detect the presence of, classify, and/or localize the one or more objects (e.g., first user 108, adult 118, child 120, clock 122, door 124, picture 126, etc.) of the scene. The video conference application may utilize the aforementioned image segmentation techniques to generate the one or more object identifiers 204a-204f. In some embodiments, the video conference application provides shapes that the user can manipulate to generate the one or more object identifiers 204a-204f. In some embodiments, the first user 108 manually generates the one or more object identifiers 204a-204f. For example, the first user 108 may use a touchscreen to draw the first identifier 204a around the first object (e.g., first user 108). In another example, the first user 108 may use a touchscreen to draw the first identifier 204a to encompass a first portion of the scene. In such an example, the filtered video stream may only comprise the portion of the scene selected by the first user 108.

In some embodiments, the privacy setting user interface 200 enables a user (e.g., first user 108) to select a policy. The first user 108 may use the one or more object identifiers 204a-204f to select objects for a first policy. For example, the first user 108 may select the first object identifier 204a corresponding to the first object (e.g., first user 108) causing the first policy to indicate that the first object (e.g., first user 108) is to be displayed in the video conference. The selection of the first object identifier 204a may result in the first filtered video stream displayed in the first section 110 of FIG. 1B. In some embodiments, the first user 102 may also select actions for the selected objects. For example, the first user 108 may select the first object identifier 204a, a first action (e.g., display without modification), a second object identifier 204b, a second action (e.g., insert avatar), and a third object identifier 204c, and a third action (e.g., blur). Such selections may result in the first filtered video stream displayed in the first section 110 of FIG. 1C.

In some embodiments, the video conference application may utilize any suitable number or types of image processing techniques to identify the one or more objects (e.g., first user 108, adult 118, child 120, clock 122, door 124, picture 126, etc.) of the scene depicted in frames and images captured by one or more cameras associated with the user device 102 and cameras associated with user devices of other video conference session participants. In some embodiments, the video conference application may utilize one or more machine learning models (e.g., naive Bayes algorithm, logistic regression, recurrent neural network, convolutional neural network (CNN), bi-directional long short-term memory recurrent neural network model (LSTM-RNN), or any other suitable model, or any combination thereof) to localize, identify, and/or classify objects in the scene. For example, the machine learning model may output a value, a vector, a range of values, any suitable numeric representation of classifications of objects, or any combination thereof indicative of one or more predicted classifications and/or locations and/or associated confidence values. In some embodiments, the classifications may be understood as any suitable categories into which objects may be classified, identified, and/or characterized. In some embodiments, the model may be trained on a plurality of labeled image pairs, where image data may be preprocessed and represented as feature vectors. For example, the training data may be labeled or annotated with indications of locations of multiple entities and/or indications of the type or class of each entity.

As another example, the video conference application may extract one or more features for a particular object and compare the extracted features to those stored locally and/or at a database or server storing features of objects and corresponding identification of objects. For example, if dimensions, shape, color, or any other suitable information, or any combination thereof, is extracted from one or more images of an object (e.g., picture 126), the video conference application may determine the object corresponds to a picture based on a similarity between the extracted information and stored information. In some embodiments, a Cartesian coordinate plane is used to identify a position of an object in the scene, with the position recorded as (X, Y) coordinates on the plane. In some embodiments, the coordinates may include a coordinate in the Z-axis, to identify a depth of each identified object in 3D space, based on images captured using 3D sensors and any other suitable depth-sensing technology. In some embodiments, coordinates may be normalized to allow for comparison to coordinates stored at the database in association with corresponding objects. As an example, the video conference application may specify that an origin of the coordinate system is considered to be a corner of a field of view within or corresponding to the scene. The position of the object may correspond to the coordinates of the center of the object or one or more other portions of the object.

Additionally or alternatively, the video conference application may utilize or be in conference with any suitable number and types of sensors to determine information related to the objects in the scene. For example, one or more sensors may be an image sensor, ultrasonic sensor, radar sensor, LED sensor, LIDAR sensor, or any other suitable sensor, or any combination thereof, to detect and classify objects in the scene. One or more sensors of the user device 102 may be used to ascertain a location of an object by outputting a light or radio wave signal and measuring a time for a return signal to be detected and/or measuring an intensity of the returned signal. In some embodiments, the video conference application may be configured to receive input from the first user 108 to identify a location and/or classification of a particular object.

In some embodiments, one or more devices and/or one or more objects in the scene may be configured to communicate wirelessly, as part of detecting objects in the scene. For example, a device associated with the first user 108, a device associated with the second user 122, and/or an Internet of Things (IoT) device (e.g., clock 122 or any other suitable object) may be equipped with sensors (e.g., a camera or image sensor, a microphone, or any other suitable sensors or any combination thereof) or other circuitry (e.g., wireless communication circuitry). Such sensors may be used to indicate to the video conference application a location of an object within the scene and/or an indication that an object is of a particular type (e.g., appliance, person, furniture, etc.). For example, such IoT devices may communicate with the video conference application via the Internet or directly, e.g., via short-range wireless communication or a wired connection. The video conference application may transmit indicators indicative of an object type (e.g., chair, table, robot vacuum, exercise equipment, thermostat, security camera, lighting system, dishwasher, or any other suitable device, or any combination thereof) and/or an orientation and location of the object. The video conference application may build an inventory of objects (e.g., indications of locations and corresponding classifications of household items, or any other suitable objects, or any combination thereof) and corresponding locations of the objects in the scene. Such inventory and corresponding location may be stored in association with one or more of the data structures (e.g., stored at the user device 102 and/or a server and/or database, and/or any other suitable device or database). The video conference application may generate a data structure for a current field of view of the user device 102, including object identifiers associated with objects in the scene, and such data structure may include coordinates representing the position of the field of view and objects in the scene.

FIG. 3 shows an illustrative privacy policy table 300, in accordance with some embodiments of this disclosure. In some embodiments, the table 300 corresponds to a policy selected by a user (e.g., first user 108). Table 300 is just one example of a table used to store policy information, similar such tables may be used. For example, different column and row values may be used as would be clear to a person of ordinary skill in the art. In some embodiments, each row corresponds to an object of a video stream. For example, the first row may correspond to a first object (e.g., first user 108), the second row may correspond to a second object (e.g., adult 118), the third row may correspond to a third object (e.g., child 120), the fourth row may correspond to a fourth object (e.g., clock 122), the fifth row may correspond to a fifth object (e.g., door 124), and the sixth row may correspond to a sixth object (e.g., picture 126). In some embodiments, the first column comprises object information about the object. The object information may comprise a plurality of feature bit vectors (represented by $F_{ij}$) and corresponding position information (represented by $P_{ij}$). For example, the first row corresponding to a first object (e.g., first user 108) may comprise a plurality of feature bit vectors and corresponding position information $(F_{11}, P_{11})$-$(F_{1n1}, P_{1n1})$. In some embodiments, the object information for a first object is the codification of the plurality of features that correspond to the first object.

In some embodiments, the table 300 comprises a second column indicating one or more actions associated with the objects identified by the corresponding object information. For example, the table 300 may indicate a policy to display the first object (e.g., first user 108) without modification, to replace the second object (e.g., adult 118) with an avatar (e.g., avatar 128), and blur the third object (e.g., child 120). The table 300 may also indicate to exclude all other objects. In some embodiments, the table 300 only comprises object information and actions related to objects that should be displayed and all other objects are automatically excluded by the device generating the filtered video stream.

In some embodiments, the table 300 may be transmitted in metadata to a device (e.g., server, user device, etc.). In some embodiments, one or more devices uses the information in the table 300 to generate a filtered video stream. For example, a device (e.g., user device 102) may receive an input from a user (e.g., first user 108) corresponding to a policy and store the policy in the table 300. The device may modify a first video stream to display the first object (e.g., first user 108) without modification, replace the second object (e.g., adult 118) with an avatar (e.g., avatar 128), and blur the third object (e.g., child 120) according to the table 300. The device may exclude the fourth object (e.g., clock 122), fifth object (e.g., door 124), and the sixth object (e.g., picture 126) according to the table 300 when generating the first filtered video stream. In some embodiments, the first section 110 of FIG. 1C displays an example of the first filtered video stream generated using the table 300.

In some embodiments, the table 300 is stored by the device that generates the filtered video stream. In some embodiments, the device applies the policy associated with the table 300 during the course of the video conference. In some embodiments, the table 300 is updated after receiving a policy update from one or more devices. For example, the policy update may comprise one or more pieces of information identifying one or more objects of the table 300 and indicate an update to the action and/or object information. In response to the policy update the device may update the table 300. For example, if the policy update indicates that the third object should be excluded, then the device updates the action associated with the third object from "blur" to "exclude." In some embodiments, the device replaces the information in table 300 with updated information contained in the policy update.

Figure 4:
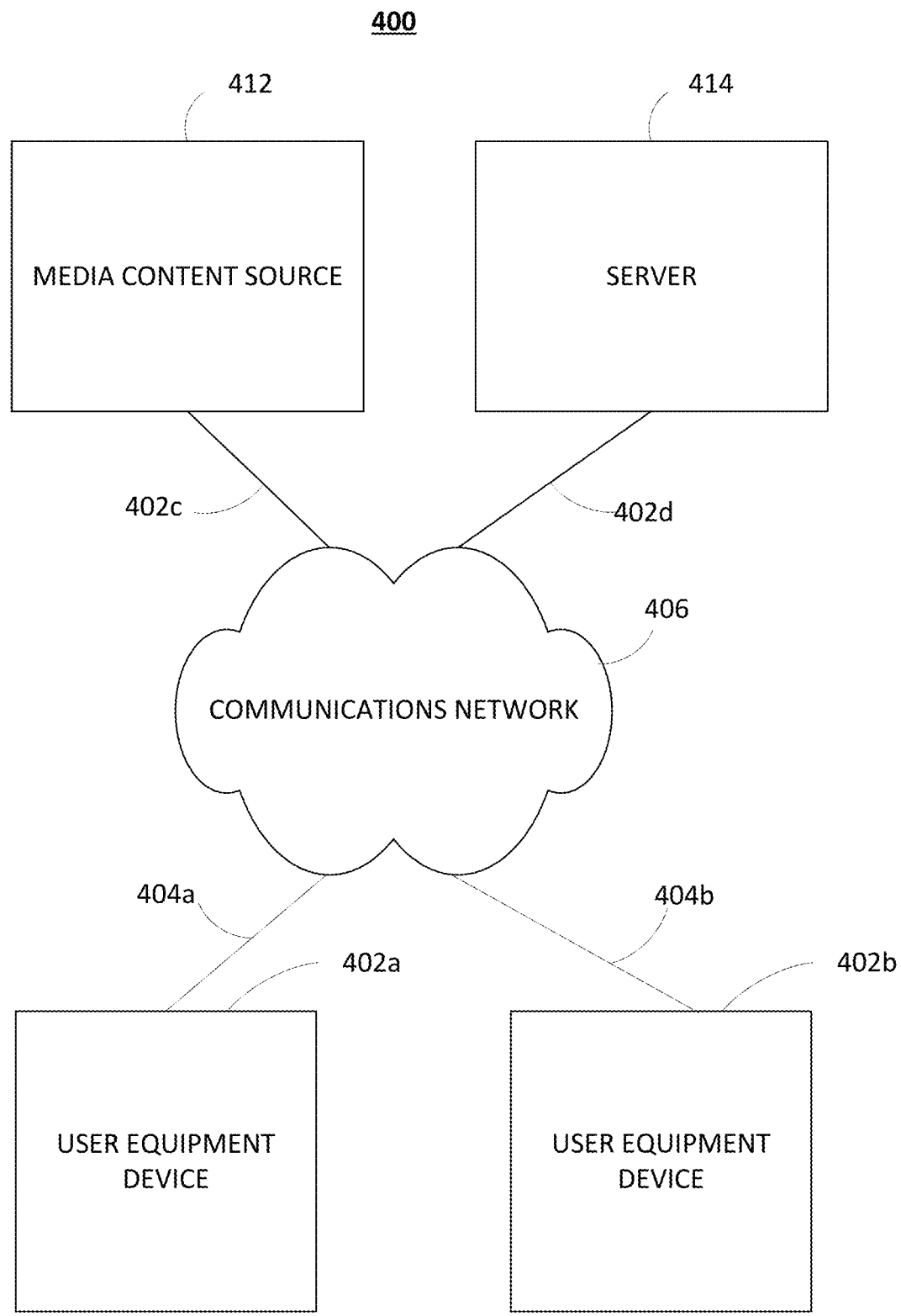
FIG. 4 shows an illustrative block diagram of a media system, in accordance with embodiments of the disclosure.
Figure 5:
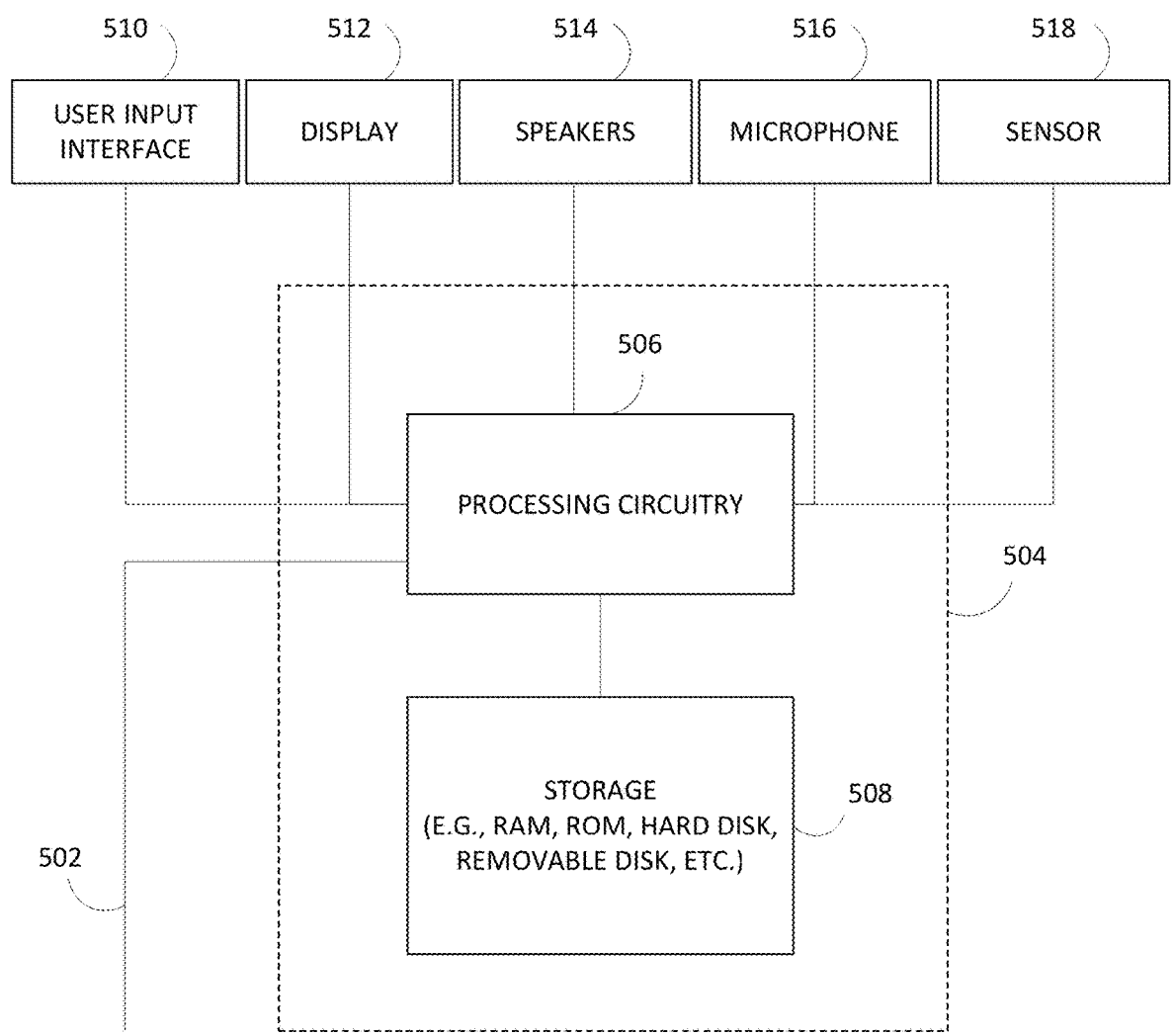
FIG. 5 shows an illustrative block diagram of a user equipment device system, in accordance with some embodiments of the disclosure.
Figure 6:
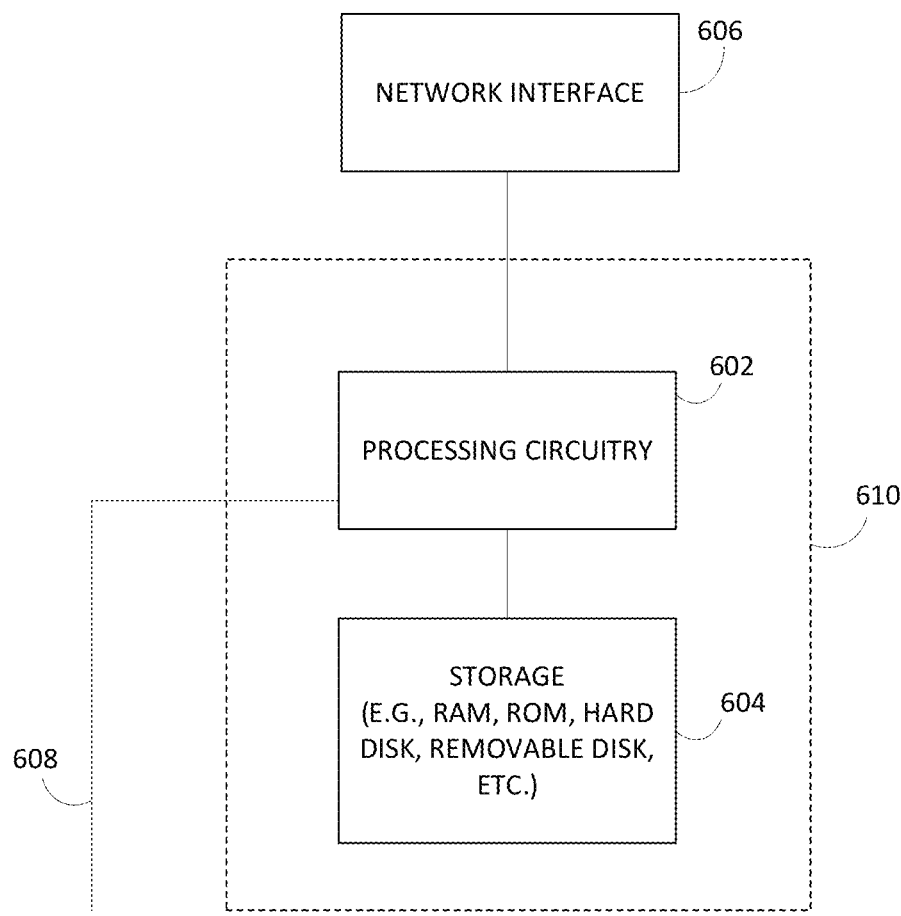
FIG. 6 shows an illustrative block diagram of a server system, in accordance with some embodiments of the disclosure.

FIGS. 4-6 describe exemplary devices, systems, servers, and related hardware for enabling user-controlled privacy settings during video conferencing. In the system 400, there can be more than or less than two user equipment devices 402 but only a first user equipment device 402a and a second user equipment device 402b are shown in FIG. 4 to avoid overcomplicating the drawing. In addition, users may utilize more than one type of user equipment device 402 and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices 402 may also communicate with each other directly through an indirect path via the communications network 406.

The user equipment devices 402, a media content source 412, and a server 414, may be coupled to communications network 406. Namely, the first user equipment device 402a is coupled to the communications network 406 via a first communications path 404a, the second user equipment device 402b is coupled to the communications network 406 via a second communications path 404b, the media content source 412 is coupled to the communications network 406 via a third communications path 404c, and the server 414 is coupled to the communications network 406 via a fourth communications path 404d. The communications network 406 may be one or more networks including the Internet, a mobile phone network, mobile voice or data network (e.g., a 4G, 5G, or LTE network), cable network, public switched telephone network, or other types of communications network or combinations of communications networks. The paths 404 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment, the paths 404 can be a wireless path. Communication with the user equipment devices 404 may be provided by one or more communications paths but is shown as a single path in FIG. 4 to avoid overcomplicating the drawing.

The media content source 412 and server 414 can be coupled to any number of databases providing information to the user equipment devices. For example, media content source 412 and server 414 may have access to augmentation data, 2D mapping data, 3D mapping data, virtual object data, user information, encryption data, and/or similar such information. The media content source 412 represents any computer-accessible source of content, such as a storage for audio content, metadata, or, similar such information. The server 414 may store and execute various software modules for enabling user-controlled privacy settings during video conferencing functionality. In the system 400, there can be more than one server 414 but only one is shown in FIG. 4 to avoid overcomplicating the drawing. In addition, the system 400 may utilize more than one type of server 414 and more than one of each type of server. In some embodiments, the user equipment device 402, media content source 412, and server 414 may store metadata associated with media content.

FIG. 5 shows a generalized embodiment of a user equipment device 500, in accordance with one embodiment. In an embodiment, the user equipment device 500 is an example of the user equipment devices described in FIGS. 1A-1D and 4 (e.g., device 102, user equipment devices 402). The user equipment device 500 may receive content and data via input/output (I/O) path 502. The I/O path 502 may provide audio content (e.g., broadcast programming, on-demand programming, Internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry should be understood to mean circuitry based on one or more microprocessors, microcontrollers, digital signal processors, programmable logic devices, field-programmable gate arrays ("FPGAs"), application-specific integrated circuits ("ASICs"), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The enabling of user-controlled privacy settings during video conferencing functionality can be at least partially implemented using the control circuitry 504. The enabling of user-controlled privacy settings during video conferencing functionality described herein may be implemented in or supported by any suitable software, hardware, or combination thereof. The providing of augmentation data, 2D data, 3D data, virtual object data, user data, and/or encryption data, can be implemented on user equipment, on remote servers, or across both.

In client-server-based embodiments, the control circuitry 504 may include communications circuitry suitable for communicating with one or more servers that may at least implement the described enabling of user-controlled privacy settings during video conferencing functionality. The instructions for carrying out the above-mentioned functionality may be stored on the one or more servers. Communications circuitry may include a cable modem, an integrated service digital network ("ISDN") modem, a digital subscriber line ("DSL") modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc ("DVD") recorders, compact disc ("CD") recorders, BLU-RAY disc ("BD") recorders, BLU-RAY 3D disc recorders, digital video recorders ("DVR", sometimes called a personal video recorder, or "PVR"), solid-state devices, quantum storage devices, gaming consoles, gaming media, or any other suitable fixed or removable storage devices, and/or any combination of the same. The storage 508 may be used to store various types of content described herein. Nonvolatile memory may also be used (e.g., to launch a boot-up routine and other instructions). Cloud-based storage, described in relation to FIG. 4 and FIG. 7, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the user equipment device 500. The control circuitry 504 may also include digital-to-analog converter circuitry and analog-to-digital converter circuitry for converting between digital and analog signals. The tuning and encoding circuitry may be used by the user equipment device 800 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the user equipment device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing. In some embodiments, voice assistants (e.g., Siri, Alexa, Google Home and similar such voice assistants) receive and process the voice commands and other speech.

The user equipment device 500 may optionally include an interface 510. The interface 810 may be any suitable user interface, such as a remote control, mouse, trackball, keypad, keyboard, touch screen, touchpad, stylus input, joystick, or other user input interfaces. A display 512 may be provided as a stand-alone device or integrated with other elements of the user equipment device 500. For example, the display 512 may be a touchscreen or touch-sensitive display. In such circumstances, the interface 510 may be integrated with or combined with the microphone 516. When the interface 510 is configured with a screen, such a screen may be one or more of a monitor, a television, a liquid crystal display ("LCD") for a mobile device, active matrix display, cathode ray tube display, light-emitting diode display, organic light-emitting diode display, quantum dot display, or any other suitable equipment for displaying visual images. In some embodiments, the interface 810 may be HDTV-capable. In some embodiments, the display 512 may be a 3D display. A speaker 514 may be controlled by the control circuitry 504. The speaker (or speakers) 514 may be provided as integrated with other elements of user equipment device 500 or may be a stand-alone unit. In some embodiments, the display 512 may be output through speaker 514.

In an embodiment, the display 512 is a headset display (e.g., when the user equipment device 500 is an XR headset). The display 512 may be an optical see-through (OST) display, wherein the display includes a transparent plane through which objects in a user's physical environment can be viewed by way of light passing through the display 512. The user equipment device 500 may generate for display virtual or augmented objects to be displayed on the display 512, thereby augmenting the real-world scene visible through the display 512. In an embodiment, the display 512 is a video see-through (VST) display. In some embodiments, the user equipment device 500 may optionally include a sensor 518. Although only one sensor 518 is shown, any number of sensors may be used. In some embodiments, the sensor 518 is a camera, depth sensors, Lidar sensor, and/or any similar such sensor. In some embodiments, the sensor 518 (e.g., image sensor(s) or camera(s)) of the user equipment device 500 may capture the real-world environment around the user equipment device 500. The user equipment device 500 may then render the captured real-world scene on the display 512. The user equipment device 500 may generate for display virtual or augmented objects to be displayed on the display 512, thereby augmenting the real-world scene visible on the display 512.

In some embodiments, the user equipment device 500 utilizes a video communication application. In some embodiments, the video communication application may be a client/server application where only the client application resides on the user equipment device 500, and a server application resides on an external server (e.g., server 600). For example, the video communication application may be implemented partially as a client application on control circuitry 504 of the user equipment device 500 and partially on server 600 as a server application running on server control circuitry 610. Server 600 may be a part of a local area network with the user equipment device 500 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 600 and/or an edge computing device), referred to as "the cloud." The user equipment device 500 may be a cloud client that relies on the cloud computing capabilities from server 600 to determine whether processing (e.g., at least a portion of virtual background processing and/or at least a portion of other processing tasks) should be offloaded from the mobile device, and facilitate such offloading. When executed by control circuitry of server 610, the video communication application may instruct control circuitry 504 to perform processing tasks for the client device and facilitate the video conference. The client application may instruct control circuitry 504 to determine whether processing should be offloaded. In some embodiments, the video conference may correspond to one or more of online meetings, virtual meeting rooms, video calls, Internet Protocol (IP) video calls, etc.

Control circuitry 504 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 504 may also include scaler circuitry for upconverting and downconverting content into the preferred output format. Control circuitry 504 may also include digital-to-analog converter circuitry and analog-to-digital converter circuitry for converting between digital and analog signals. The tuning and encoding circuitry may be used by the user equipment device 500 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from the user equipment device 500, the tuning and encoding circuitry (including multiple tuners) may be associated with storage 508.

The video communication application may be implemented using any suitable architecture. For example, it may be a stand-alone application wholly-implemented on the user equipment device 500. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide video conferencing functionality and generate any of the displays discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the video communication application is a client/server-based application. Data for use by a thick or thin client implemented on each one of user equipment device 500 may be retrieved on-demand by issuing requests to a server remote to the user equipment device 500. For example, the remote server may store the instructions for the application in a storage device. The remote server may process the stored instructions using circuitry and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on the user equipment device 500. The user equipment device 500 may receive inputs from the user via input interface 510 and transmit those inputs to the remote server for processing and generating the corresponding displays. For example, the user equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to user equipment device 500 for presentation to the user.

In some embodiments, the video communication application may be downloaded and interpreted or otherwise run by an interpreter or virtual machine (run by control circuitry 504). In some embodiments, the video communication application may be encoded in the ETV Binary Interchange Format (EBIF), received by control circuitry 504 as part of a suitable feed, and interpreted by a user agent running on control circuitry 504. For example, the video communication application may be an EBIF application. In some embodiments, the video communication application may be defined by a series of JAVA-based files that are received and run by a local virtual machine or other suitable middleware executed by control circuitry 504. In some of such embodiments (e.g., those employing MPEG-2, MPEG-4, HEVC or any other suitable digital media encoding schemes), video communication application may be, for example, encoded and transmitted in an MPEG-2 object carousel with the MPEG audio and video packets of a program.

FIG. 6 shows an illustrative block diagram of a server system 600, in accordance with some embodiments of the disclosure. Server system 600 may include one or more computer systems (e.g., computing devices), such as a desktop computer, a laptop computer, and a tablet computer. In some embodiments, the server system 600 is a data server that hosts one or more databases (e.g., databases of images or videos), models, or modules or may provide various executable applications or modules. In practice, and as recognized by those of ordinary skill in the art, items shown separately could be combined and some items could be separated. In some embodiments, not all shown items must be included in server system 600. In some embodiments, server system 600 may comprise additional items.

The server system 600 can include processing circuitry 602 that includes one or more processing units (processors or cores), storage 604, one or more network or other communications network interfaces 606, and one or more I/O paths 608. I/O paths 608 may use communication buses for interconnecting the described components. I/O paths 608 can include circuitry (sometimes called a chipset) that interconnects and controls communications between system components. Server system 600 may receive content and data via I/O paths 608. The I/O path 608 may provide data to control circuitry 610, which includes processing circuitry 602 and a storage 604. The control circuitry 610 may be used to send and receive commands, requests, and other suitable data using the I/O path 608. The I/O path 608 may connect the control circuitry 610 (and specifically the processing circuitry 602) to one or more communications paths. I/O functions may be provided by one or more of these communications paths but are shown as a single path in FIG. 6 to avoid overcomplicating the drawing.

The control circuitry 610 may be based on any suitable processing circuitry such as the processing circuitry 602. As referred to herein, processing circuitry should be understood to mean circuitry based on one or more microprocessors, microcontrollers, digital signal processors, programmable logic devices, FPGAs, ASICs, etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Memory may be an electronic storage device provided as the storage 604 that is part of the control circuitry 610. Storage 604 may include random-access memory, read-only memory, high-speed random-access memory (e.g., DRAM, SRAM, DDR RAM, or other random-access solid-state memory devices), non-volatile memory, one or more magnetic disk storage devices, optical disk storage devices, flash memory devices, other non-volatile solid-state storage devices, quantum storage devices, and/or any combination of the same.

In some embodiments, storage 604 or the computer-readable storage medium of the storage 604 stores an operating system, which includes procedures for handling various basic system services and for performing hardware dependent tasks. In some embodiments, storage 604 or the computer-readable storage medium of the storage 604 stores a communications module, which is used for connecting the server system 600 to other computers and devices via the one or more communication network interfaces 606 (wired or wireless), such as the internet, other wide area networks, local area networks, metropolitan area networks, and so on. In some embodiments, storage 604 or the computer-readable storage medium of the storage 604 stores a web browser (or other application capable of displaying web pages), which enables a user to communicate over a network with remote computers or devices. In some embodiments, storage 604 or the computer-readable storage medium of the storage 604 stores a database for augmentation data, 2D mapping data, 3D mapping data, virtual object data, user information, transform key data, encryption data, and/or similar such information.

In some embodiments, executable modules, applications, or sets of procedures may be stored in one or more of the previously mentioned memory devices and corresponds to a set of instructions for performing a function described above. In some embodiments, modules or programs (i.e., sets of instructions) need not be implemented as separate software programs, procedures, or modules, and thus various subsets of modules may be combined or otherwise rearranged in various implementations. In some embodiments, the storage 604 stores a subset of the modules and data structures identified above. In some embodiments, the storage 604 may store additional modules or data structures not described above.

Figure 7:
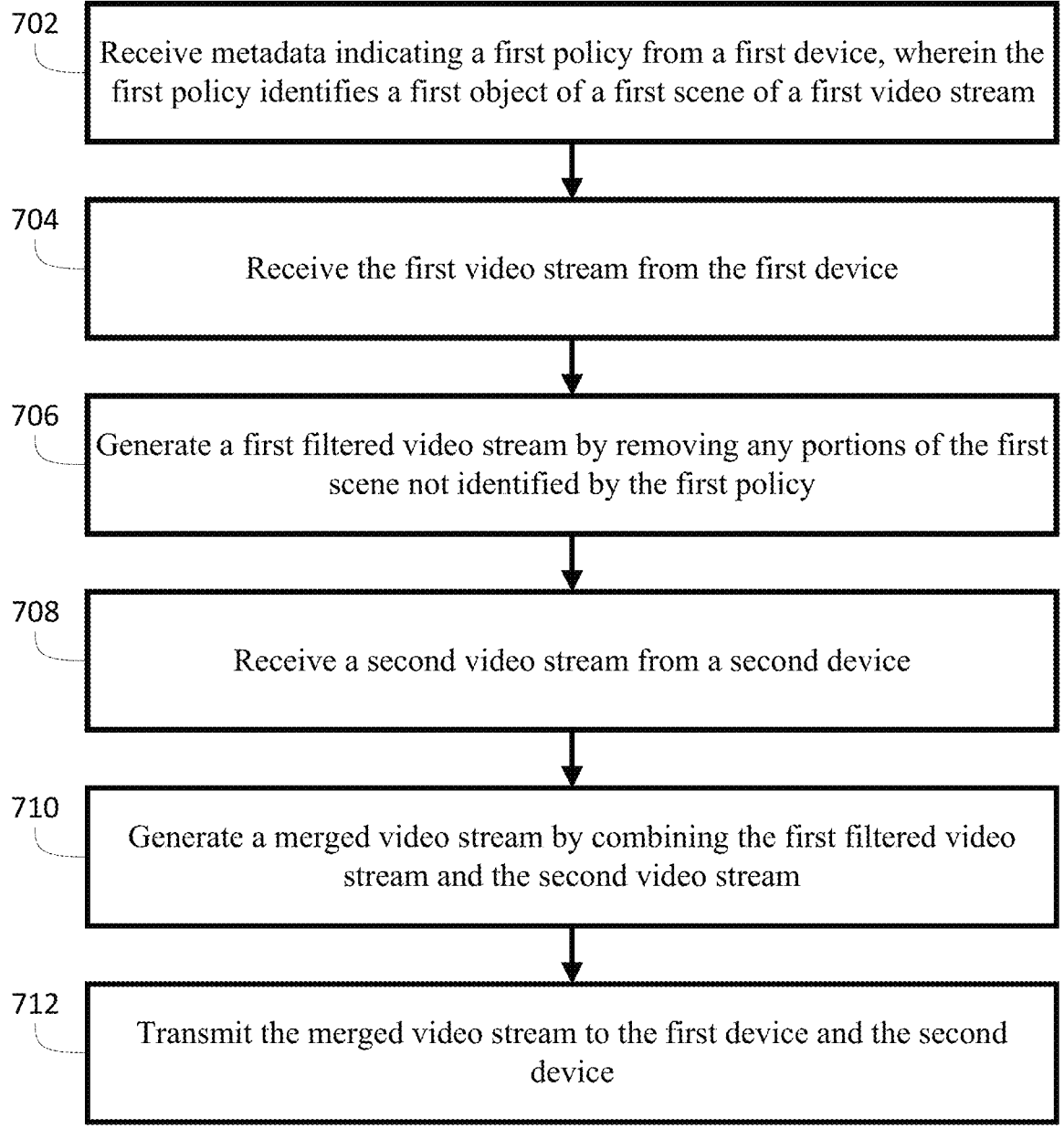
FIG. 7 is an illustrative flowchart of a process for enabling user-controlled privacy settings during video conferencing, in accordance with some embodiments of this disclosure.

FIG. 7 is an illustrative flowchart of a process 700 for enabling user-controlled privacy settings during video conferencing, in accordance with some embodiments of the disclosure. Process 700, and any of the following processes, may be executed by control circuitry 504 on a user equipment device 500 and/or control circuitry 610 on a server 600. In some embodiments, control circuitry may be part of a remote server separated from the user equipment device 500 by way of a communications network or distributed over a combination of both. In some embodiments, instructions for executing process 700 may be encoded onto a non-transitory storage medium (e.g., the storage 508, the storage 604) as a set of instructions to be decoded and executed by processing circuitry (e.g., the processing circuitry 506, the processing circuitry 602). Processing circuitry may, in turn, provide instructions to other sub-circuits contained within control circuitry, such as the encoding, decoding, encrypting, decrypting, scaling, analog/digital conversion circuitry, and the like. It should be noted that any of the processes, or any step thereof, could be performed on, or provided by, any of the devices described in FIGS. 1A-D and 4-6. Although the processes are illustrated and described as a sequence of steps, it is contemplated that various embodiments of the processes may be performed in any order or combination and need not include all the illustrated steps.

At 702, control circuitry receives metadata indicating a first policy from a first device, wherein the first policy identifies a first object of a first scene of a first video stream. In some embodiments, the first device is a user equipment device (e.g., user equipment device 500) participating in a video conference. In some embodiments, the first video stream depicts a first scene comprising one or more objects (e.g., first user 108, adult 118, child 120, clock 122, door 124, picture 126, etc.). In some embodiments, the first policy corresponds to one or more inputs received from a user. For example, a first user may select, at the first device, a first object (e.g., first user 108) and a first action (e.g., display without modification) corresponding to the first object. The first action may define display actions corresponding to the selected object when generating a video conference. For example, the first policy may indicate that the first object (e.g., first user 108) may be displayed without modification when generating the video conference. In some embodiments, the first policy comprises a plurality of features and/or other information corresponding to the one or more objects (e.g., first object) identified by the policy. Although only one object is described, the first policy may identify more than one objects and more than one actions.

At 704, control circuitry receives the first video stream from the first device. In some embodiments, metadata is included with the first video stream. The video stream may be generated using a plurality of images captured by one or more sensors (e.g., camera) of the first device. In some embodiments, the video stream comprises video and audio data associated with the first scene. In some embodiments, the video and audio data comprise information to enable synchronization of the audio and video feed at the destination device. In some embodiments, the video stream comprises the combination of the audio and video feed into a multimedia data stream.

At 706, control circuitry generates a first filtered video stream by removing any portions of the first scene not identified by the first policy. In some embodiments, the control circuitry uses information contained in the first policy to generate the first filtered video stream. For example, the control circuitry may remove all portions of the first scene that do not contain the first object identified by the first policy. In some embodiments, the control circuitry uses one or more techniques (e.g., an identification algorithm) to identify the first object and then removes the portions of the first scene that do not correspond to the first object. In some embodiments, the control circuitry uses information contained in the first policy (e.g., plurality of features associated with the first object) to remove the portions of the first scene that do not correspond to the first object. In some embodiments, the first policy comprises one or more actions associated with the first object. For example, the first action may indicate to display the first object without modification. In such an example, the control circuitry may remove all portions of the first scene that do not correspond to the first object and then generate the first filtered video stream to display the first object without modification. In another example, the first action may indicate to replace the first object with text. In such an example, the control circuitry may remove all portions of the first scene that do not correspond to the first object and then replace the first object with text in the first filtered video stream. In some embodiments, the control circuitry further modifies the first filtered video stream by including a virtual background in the removed portions of the first scene. The virtual background may depict any suitable image or video or animation simulating an environment desired by a particular user.

At 708, control circuitry receives a second video stream from a second device. In some embodiments, the second device is participating in a video conference with the first device. In some embodiments, the control circuitry uses the same or similar methodologies described at step 704 when receiving the second video stream.

At 710, control circuitry generates a merged video stream by combining the first filtered video stream and the second video stream. In some embodiments, the merged video stream represents video conference data. In some embodiments, the second video stream is also filtered before the merged video stream is generated. For example, the second video stream may be associated with a second policy. The control circuitry may generate a second filtered video stream using the second video stream and the second policy. The control circuitry may then combine the first filtered video stream and the second filter video stream to generate the merged video stream. Although only two video streams are described, any number of video streams may be combined. For example, the control circuitry may merge 10 video streams for a video conference of 10 participants.

At 712, control circuitry transmits the merged video stream to the first device and the second device. In some embodiments, the control circuitry transmits the merged video stream to all the devices participating in a video conference. In some embodiments, one or more devices use the merged video stream to generate a video conference user interface (e.g., the user interface shown by the display 104 of the user device 102 of FIG. 1B). In some embodiments, the first device and second device may use different parts of the merged video stream to generate a video conference interface. For example, the first device may generate a first video conference interface (e.g., the user interface shown by the display 104 of the user device 102 of FIG. 1B) and the second device may generate a second video conference interface that does not display the second video stream.

Figure 8:
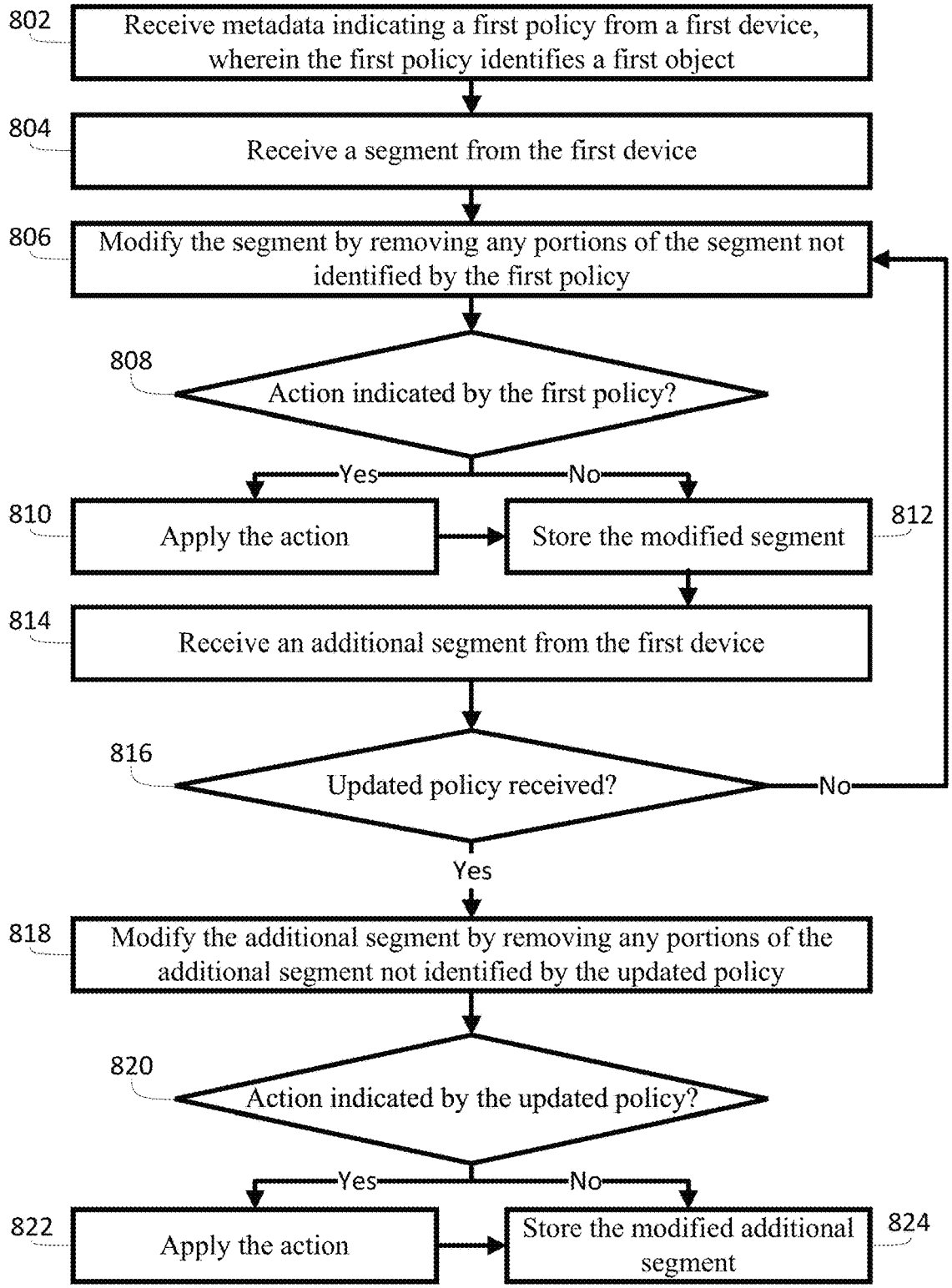
FIG. 8 is another illustrative flowchart of a process for enabling user-controlled privacy settings during video conferencing, in accordance with some embodiments of this disclosure.

FIG. 8 is another illustrative flowchart of a process for enabling user-controlled privacy settings during video conferencing, in accordance with some embodiments of this disclosure.

At 802, control circuitry receives metadata indicating a first policy from a first device, wherein the first policy identifies a first object. In some embodiments, the control circuitry uses the same or similar methodologies described at step 702 above.

At 804, control circuitry receives a segment from the first device. In some embodiments, the segment corresponds to a portion of a video stream. For example, a first video stream may comprise a plurality of segments. In some embodiments, the control circuitry uses the same or similar methodologies described at step 704 above, when receiving the first video stream to receive the segment from the first device.

At 806, control circuitry modifies the segment by removing any portions of the segment not identified by the first policy. In some embodiments, the control circuitry uses one or more techniques (e.g., an identification algorithm) to identify the first object and then removes the portions of the segment that do not correspond to the first object. In some embodiments, the control circuitry uses information contained in the first policy (e.g., plurality of features associated with the first object) to remove the portions of the first segment that do not correspond to the first object. In some embodiments, the first policy identifies more than one object and the control circuitry removes the portions of the first segment that do not correspond to the identified objects.

At 808, control circuitry determines whether the first policy indicates an action. If the control circuitry determines that the first policy indicates an action, then the process 800 continues to step 810. If the control circuitry determines that the first policy does not indicate an action, then the process 800 continues to step 812.

At 810, control circuitry applies the action indicated by the first policy. In some embodiments, the action indicates displaying the first object without modification. The control circuitry may remove all portions of the segment that do not correspond to the first object and then generate the modified segment to display the first object without modification. In some embodiments, the action indicates modifying the first object. For example, the action may indicate to blur the first object. In such an example, the control circuitry may remove all portions of the segment that do not correspond to the first object and then blur the first object in the modified segment. In another example, the action may indicate to replace the first object with an avatar. In such an example, the control circuitry may remove all portions of the segment that do not correspond to the first object and then replace the first object with the avatar in the modified segment. In some embodiments, the control circuitry replaces the first object with an item (e.g., avatar, virtual representation of the object, text box, etc.) and the item is indicated by the first policy. For example, a user of the first device may select an item from among a plurality of items provided by the first device. In some embodiments, the item is automatically generated using the control circuitry. For example, the control circuitry may generate the item using one or more dimensions or characteristics of the object that the item is replacing.

In some embodiments, the first policy indicates more than one actions. For example, the first policy may indicate a first object (e.g., first user 108), a first action (e.g., display without modification), a second object (e.g., adult 118), a second action (e.g., replace with text), a third object (e.g., picture 126), and a third action (e.g., replace with virtual object). In such an example, the control circuitry may remove all portions of the segment that do not correspond to the first object, the second object, and the third object. The control circuitry may also generate the modified segment so that the first object is displayed without modification, the second object is replaced with text, and the third object is replaced with a virtual object. In some embodiments, the control circuitry further modifies the modified segment by including a virtual background in the removed portions of the segment. The virtual background may depict any suitable image or video or animation simulating an environment desired by a particular user.

At 812, control circuitry stores the modified segment. In some embodiments, the control circuitry stores the modified segment in storage (e.g., storage 604). In some embodiment, the control circuitry stores the modified segment in one or more databases accessible by the first device. In some embodiments, the control circuitry only stores the information indicated by the first policy. For example, if the first policy indicates a first object, the control circuitry only stores the information related to the first object and does not store any information about the portions of the segment that are removed. In some embodiments, the modified segment is stored along with a plurality of modified segments. For example, the control circuitry may generate a plurality of modified segments corresponding to a plurality of actions and segments received from a plurality of devices (e.g., device participating in a video conference). In some embodiments, the control circuitry merges the plurality of modified segments corresponding to the plurality of devices and stores the merged plurality of modified segments. In some embodiments, the one or more devices (e.g., first device) can access the modified segment after the modified segment is stored. For example, the first device may receive the stored modified segment from the control circuitry after the completion of a video conference corresponding to the modified segment.

At 814, control circuitry receives an additional segment from the first device. In some embodiments, the additional segment corresponds to a portion of a video stream. In some embodiments, the additional segment corresponds to the same video stream as the segment received at step 804. In some embodiments, the additional segment is associated with a time stamp after the segment received at step 804. For example, the segment may correspond to a first time and the additional segment corresponds to a second time subsequent to the first time. In some embodiments, the control circuitry uses the same or similar methodologies described at step 704 above, when receiving the first video stream to receive the additional segment from the first device.

At 816, control circuitry determines whether an updated policy has been received. In some embodiments, the control circuitry receives the updated policy from the first device using the same or similar methodology as when receiving the first policy from the first device. For example, the control circuitry may receive additional metadata indicating the updated policy from the first device. In some embodiments, the updated policy identifies the same object identified by the first policy. For example, the first policy may indicate displaying the first object without modification and the updated policy may indicate to blur the first object. In some embodiments, the updated policy identifies a different object than what was identified by the first policy. For example, the first policy may indicate displaying the first object without modification and the updated policy may indicate to display a second object without modification.

In some embodiments, the updated policy corresponds to one or more inputs received from a user. For example, a first user may select, at the first device, an option to update the policy and then select an addition and/or removal of one or more objects. The first user may also add/change/remove one or more actions corresponding to the selected objects. For example, the first user may change a first action related to the first object from display the first object without modification to blur the first object. In some embodiments, the first user inputs a new policy (the updated policy) during a time frame subsequent to when the first policy was generated. In some embodiments, the updated policy comprises a plurality of features and/or other information corresponding to the one or more objects (e.g., first object) identified by the updated policy. If the control circuitry determines that the updated policy has been received, then the process 800 continues to step 818. If the control circuitry determines that the updated policy has not been received, then the process 800 continues to step 806. For example, if no updated policy is received, the control circuitry modifies the additional segments according to the updated policy.

At 818, control circuitry modifies the additional segment by removing any portions of the additional segment not identified by the updated policy. In some embodiments, the control circuitry uses the same or similar methodologies described at step 806 when modifying the additional segment according to the updated policy.

At 820, control circuitry determines whether the updated policy indicates an action. If the control circuitry determines that the updated policy indicates an action, then the process 800 continues to step 822. If the control circuitry determines that the updated policy does not indicate an action, then the process 800 continues to step 824.

At 822, control circuitry applies the action indicated by the updated policy. In some embodiments, the control circuitry applies the action indicated by the updated policy to the additional segment using the same or similar methodologies described at step 810 in relation to the control circuitry applying the actions indicated by the first policy to the segments.

At 824, control circuitry stores the modified additional segment. In some embodiments, the control circuitry uses the same or similar methodologies described at step 812 when storing the modified additional segments. In some embodiments, the control circuitry also updates the previously stored modified segments according to the updated policy. For example, the updated policy may comprise a storage update request. The storage update request may indicate one or more objects to remove from previously stored segments. For example, the control circuitry may store the modified segment at step 812 and the modified segment may comprise the first object, a second object, and a third object as indicated by the received first policy. The storage update request may indicate that the second object and the third object are to be removed from the previously stored segments. The control circuitry may then remove the second object and the third object from the stored modified segment. If the first device subsequently receives the stored modified segment, the second object and the third object may not be included in the stored modified segment. In some embodiments, objects can only be removed or modified from the stored modified segments because the control circuitry only stores objects identified by the received policies and does not store information related to objects not identified by the received policies.

Figure 9:
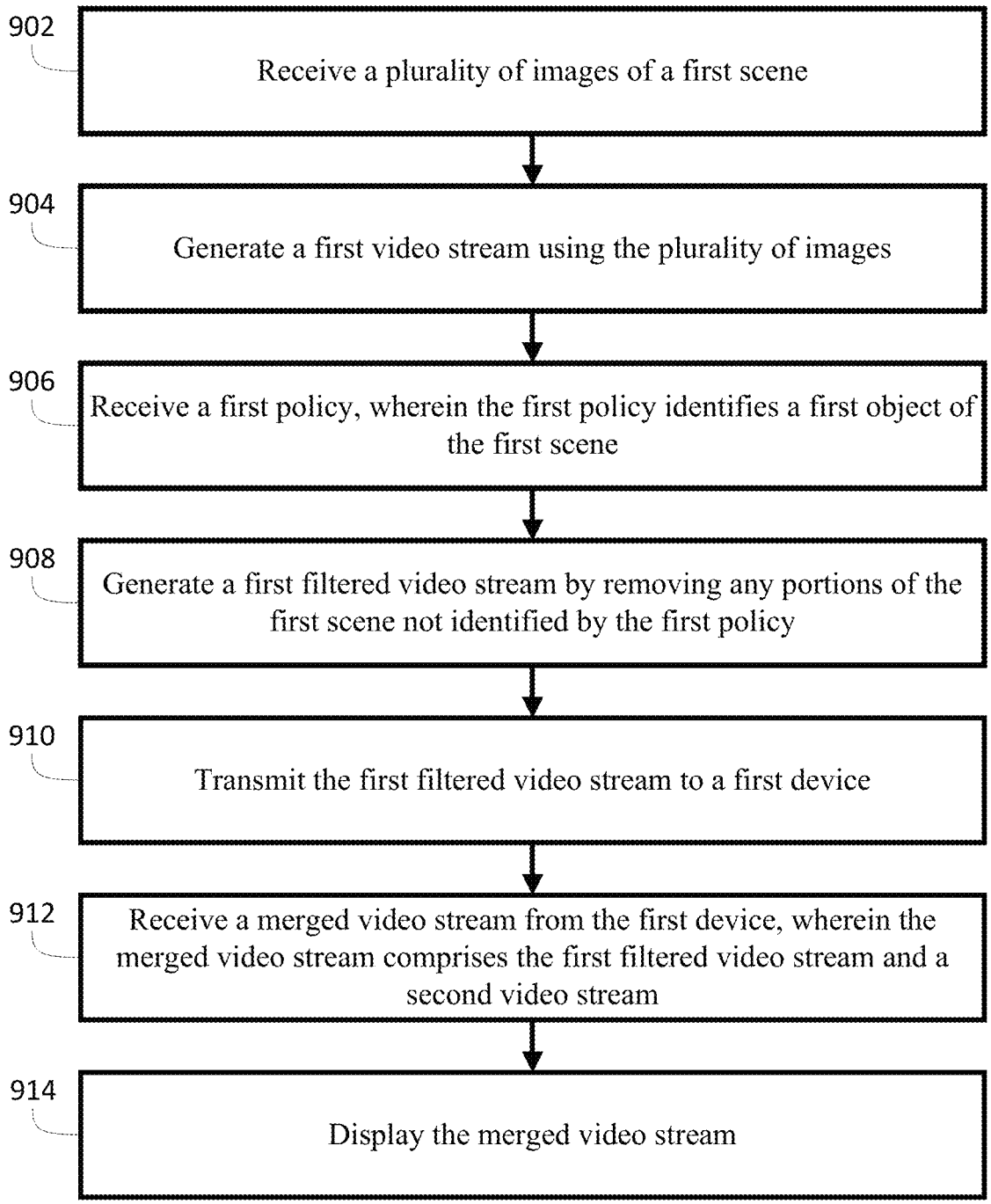
FIG. 9 is another illustrative flowchart of a process for enabling user-controlled privacy settings during video conferencing, in accordance with some embodiments of this disclosure.

FIG. 9 is another illustrative flowchart of a process for enabling user-controlled privacy settings during video conferencing, in accordance with some embodiments of this disclosure.

At 902, control circuitry receives a plurality of images of a first scene. In some embodiments, the control circuitry is a user equipment device (e.g., user device 102, user equipment device 500). In some embodiments, the control circuitry uses one or more sensors (e.g., sensor 518) to capture the plurality of images. For example, the control circuitry may use a camera to capture one or more images of the first scene.

At 904, control circuitry generates a first video stream using the plurality of images. The video stream may comprise one or more objects (e.g., first user 108, adult 118, child 120, clock 122, door 124, picture 126, etc.). The control circuitry may be configured to detect the presence of, classify, identify, and/or localize such one or more objects. In some embodiments, the control circuitry uses data received from one or more sensors (e.g., sensor 518) to identify the one or more objects in the first scene. For example, the control circuitry may extract a plurality of features from the one or more images captured by a camera. The control circuitry may use the plurality of features to identify the one or more objects in the first scene. In some embodiments, the control circuitry uses one or more techniques (e.g., feature matching) to determine that a set of features of the plurality of features relates to an object. For example, a first set of features of the plurality of features may relate to a first object and a second set of features of the plurality of features may relate to a second object. In some embodiments, one or more of the processing steps described herein are performed by a device other than the control circuitry. For example, the control circuitry may capture the images and transmit the images to a trusted device (e.g., edge server), where the data is processed.

At 906, control circuitry receives a first policy, wherein the first policy identifies a first object of the first scene. In some embodiments, the control circuitry receives the first policy by receiving one or more inputs from a user. For example, the control circuitry may generate a privacy setting user interface (e.g., privacy setting user interface 200) that the user may use to input the first policy. For example, the user may select a first object causing the first policy to indicate that the first object is to be displayed in the video conference. In some embodiments, the user may also select one or more actions for the selected objects. For example, the user may select a first action (e.g., display without modification) corresponding to a first object, a second action (e.g., insert avatar) corresponding to a second object, and a third action (e.g., blur) corresponding to a third object.

At 908, control circuitry generates a first filtered video stream by removing any portions of the first scene not identified by the first policy. In some embodiments, the control circuitry uses information associated with the first policy to generate the first filtered video stream. For example, the control circuitry may remove all portions of the first scene that do not contain the first object identified by the first policy. In some embodiments, the control circuitry uses one or more techniques (e.g., an identification algorithm) to identify the first object and then removes the portions of the first scene that do not correspond to the first object. In some embodiments, the control circuitry also applies the one or more actions associated with the first object. For example, a first action may indicate to display the first object without modification. In such an example, the control circuitry may remove all portions of the first scene that do not correspond to the first object and then generate the first filtered video stream to display the first object without modification. In another example, the first action may indicate replacing the first object with text. In such an example, the control circuitry may remove all portions of the first scene that do not correspond to the first object and then replace the first object with text in the first filtered video stream. In some embodiments, the control circuitry further modifies the first filtered video stream by including a virtual background in the removed portions of the first scene. The virtual background may depict any suitable image or video or animation simulating an environment desired by a particular user.

At 910, control circuitry transmits the first filtered video stream to a first device. In some embodiments, the first device is a server (e.g., server 600) hosting the video conference.

At 912, control circuitry receives a merged video stream from the first device, wherein the merged video stream comprises the first filtered video stream and a second video stream At 914, control circuitry displays the merged video stream. In some embodiments, the control circuitry displays the merged video using one or more displays (e.g., display 512).

Figure 10:
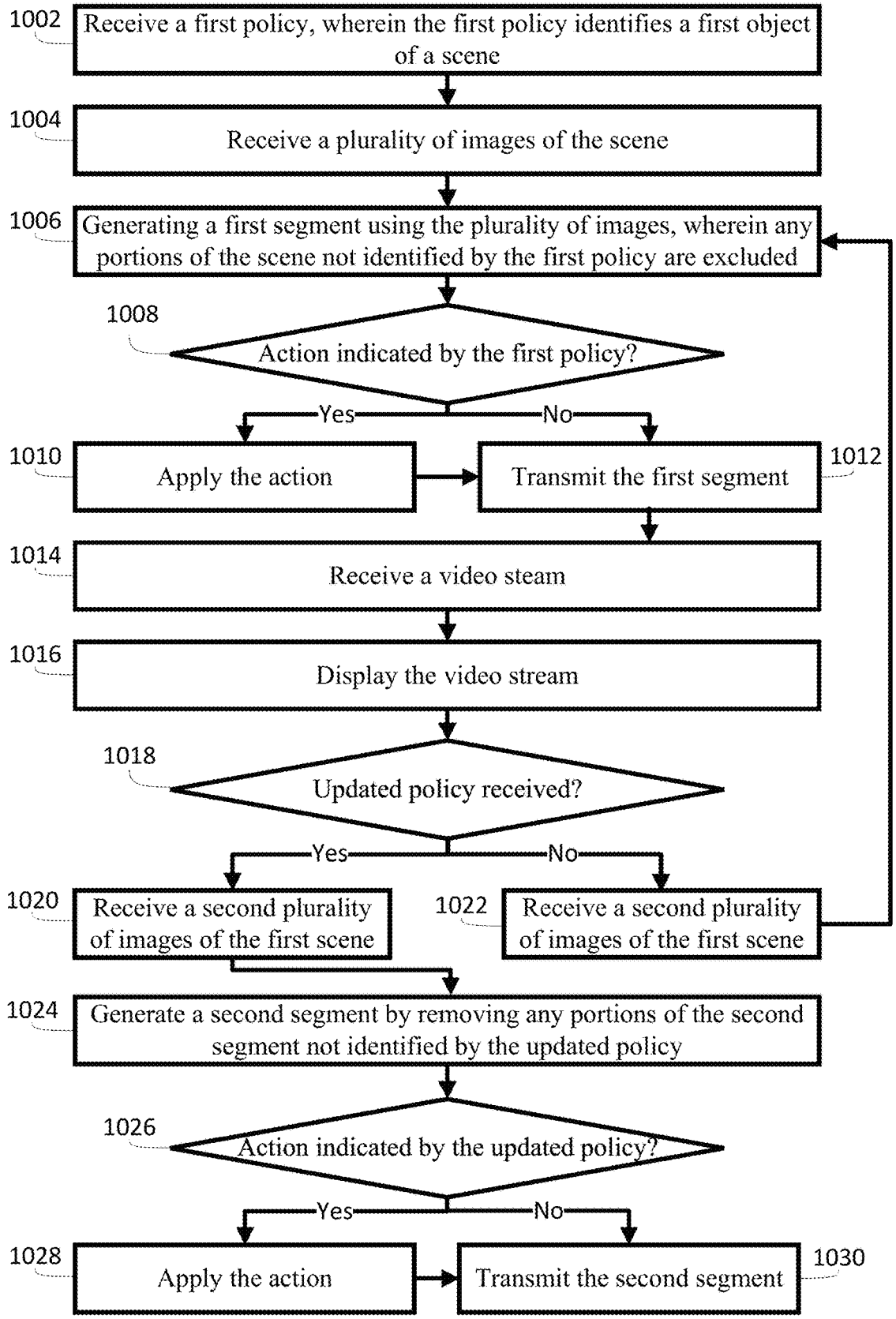
FIG. 10 is another illustrative flowchart of a process for enabling user-controlled privacy settings during video conferencing, in accordance with some embodiments of this disclosure.

FIG. 10 is another illustrative flowchart of a process for enabling user-controlled privacy settings during video conferencing, in accordance with some embodiments of this disclosure.

At 1002, control circuitry receives a first policy, wherein the first policy identifies a first object of a scene. In some embodiments, the control circuitry uses the same or similar methodologies described above at step 906 to receive the first policy, wherein the first policy identifies the first object of the first scene.

At 1004, control circuitry receives a plurality of images of the scene. In some embodiments, the control circuitry uses the same or similar methodologies described above at step 902 to receive the plurality of images of the first scene.

At 1006, control circuitry generates a first segment using the plurality of images, wherein any portions of the first scene not identified by the first policy are excluded. In some embodiments, the segment corresponds to a portion of a video stream. For example, a first video stream may comprise a plurality of segments. In some embodiments, the control circuitry uses one or more techniques (e.g., an identification algorithm) to identify the first object in the plurality of images, then removes the portions of the scene that do not correspond to the first object when generating the first segment.

At 1008, control circuitry determines whether the first policy indicates an action. If the control circuitry determines that the first policy indicates an action, then the process 1000 continues to step 1010. If the control circuitry determines that the first policy does not indicate an action, then the process 1000 continues to step 1012.

At 1010, control circuitry applies the action indicated by the first policy. In some embodiments, the action indicates modifying the first object. For example, the action may indicate to blur the first object. In such an example, the control circuitry may remove all portions of the plurality of images that do not correspond to the first object and then blur the first object when generating the first segment. In another example, the action may indicate to replace the first object with an avatar. In such an example, the control circuitry may remove all portions of the first plurality of images that do not correspond to the first object and then replace the first object with the avatar when generating the first segment. In some embodiments, the control circuitry replaces the first object with an item (e.g., avatar, virtual representation of the object, text box, etc.) and the item is indicated by the first policy. For example, a user of the first device may select an item from among a plurality of items provided by the first device. In some embodiments, the item is automatically generated using the control circuitry. For example, the control circuitry may generate the item using one or more dimensions or characteristics of the object that the item is replacing.

In some embodiments, the first policy indicates more than one actions. For example, the first policy may indicate a first object (e.g., first user 108), a first action (e.g., display without modification), a second object (e.g., adult 118), a second action (e.g., replace with text), a third object (e.g., picture 126), and a third action (e.g., replace with virtual object). In such an example, the control circuitry may remove all portions of the plurality of images that do not correspond to the first object, the second object, and the third object when generating the first segment. The control circuitry may also generate the first segment so that the first object is displayed without modification, the second object is replaced with text, and the third object is replaced with a virtual object. In some embodiments, the control circuitry also replaces the removed portions with a virtual background when generating the first segment. The virtual background may depict any suitable image or video or animation simulating an environment desired by a particular user.

At 1012, control circuitry transmits the first segment. In some embodiments, the control circuitry transmits the first segment to a server. For example, the control circuitry may transmit the first segment is a server (e.g., server 600) hosting a video conference associated with the first segment. In another example, the control circuitry may transmit the first segment to an edge server. In some embodiments, the control circuitry transmits the first segment to a user device. For example, the control circuitry may transmit the first segment to a user device participating in a video conference associated with the first segment.

At 1014, control circuitry receives a video stream. In some embodiments, the video stream is received from the same device that the control circuitry transmitted the first segment to at step 1012. In some embodiments, the video stream comprises the first segment. For example, the video stream may be a merged video stream generated by a server hosting a video conference. In some embodiments, the video stream comprises one or more segments from other devices (e.g., devices participating in a video conference).

At 1016, control circuitry displays the video stream. In some embodiments, the control circuitry displays the video stream using one or more displays (e.g., display 512).

At 1018, control circuitry determines whether an updated policy has been received. In some embodiments, the control circuitry receives the updated policy using the same or similar methodology as when receiving the first policy. In some embodiments, a user may select, via an interface, an option to update the policy and then select an addition and/or removal of one or more objects. The first user may also add/change/remove one or more actions corresponding to the selected objects. For example, the user may change a first action related to the first object from display the first object without modification to blur the first object. In some embodiments, the first user inputs a new policy (the updated policy) during a time frame subsequent to when the first policy was inputted. In some embodiments, the updated policy identifies the same object identified by the first policy. For example, the first policy may indicate displaying the first object without modification and the updated policy may indicate to blur the first object. In some embodiments, the updated policy identifies a different object than what was identified by the first policy. For example, the first policy may indicate displaying the first object without modification and the updated policy may indicate to display a second object without modification.

If the control circuitry determines that the updated policy has been received, then the process 1000 continues to step 1020. If the control circuitry determines that the updated policy has not been received, then the process 1000 continues to step 1022. In some embodiments, step 1020 and/or step 1022 use the same or similar methodologies described above at step 902 to receive the second plurality of images of the first scene. In some embodiments, if no updated policy is received then the second plurality of images are used to generate subsequent segments, wherein any portions of the scene not identified by the first policy are exclude. In some embodiments, if the updated policy is received the process 1000 continues to step 1024 where the updated policy is applied to the second plurality of images.

At 1024, control circuitry generates a second segment by removing any portions of the second segment not identified by the updated policy. In some embodiments, the control circuitry uses the same or similar methodologies described at step 1006 to generate the second segment according to the updated policy.

At 1026, control circuitry determines whether the updated policy indicates an action. If the control circuitry determines that the updated policy indicates an action, then the process 1000 continues to step 1028. If the control circuitry determines that the updated policy does not indicate an action, then the process 1000 continues to step 1030.

At 1028, control circuitry applies the action indicated by the updated policy. In some embodiments, the control circuitry applies the action indicated by the updated policy to the second segment using the same or similar methodologies described at step 1010 in relation to the control circuitry applying the actions indicated by the first policy to the first segment.

At 1030, control circuitry transmits the second segment. In some embodiments, the control circuitry uses the same or similar methodologies described at step 1012 when transmitting the second segment.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   capturing a plurality of images of a first scene;
   generating a first video stream using the plurality of images;
   receiving a first policy, wherein the first policy identifies:
      a first object of the first scene of the first video stream;
      a second object of the first scene of the first video stream;
      a first action corresponding to the first object of the first scene of the first video stream; and
      a second action corresponding to the second object of the first scene of the first video stream;
   generating a first filtered video stream by including any portion of the first scene identified by the first policy;
   transmitting the first filtered video stream to a first device;
   receiving a merged video stream from the first device, wherein the merged video stream comprises the first filtered video stream and a second video stream; and
   displaying the merged video stream.

2. The method of claim 1, further comprising recording the merged video stream at the first device.

3. The method of claim 2, wherein the first device is a server.

4. The method of claim 1, wherein generating the first filtered video stream by including any portion of the first scene identified by the first policy further comprises:
   removing portions of the first scene not identified by the first policy;
   displaying the first object according to the first action; and
   displaying the second object according to the second action.

5. The method of claim 4, wherein displaying the second object according to the second action comprises blurring the second object in the first filtered video stream.

6. The method of claim 4, wherein displaying the second object according to the second action comprises replacing the second object with a text box in the first filtered video stream.

7. The method of claim 4, wherein displaying the second object according to the second action comprises replacing the second object with a virtual object in the first filtered video stream.

8. The method of claim 7, further comprising receiving a selection of the virtual object from the first device.

9. The method of claim 7, further comprising generating the virtual object based on one or more characteristics of the second object.

10. The method of claim 1, further comprising:
    capturing an additional plurality of images of the first scene subsequent to the plurality of images;
    generating subsequent segments of the first video stream using the additional plurality of images;
    receiving an updated policy;
    generating filtered subsequent segments of the first video stream by including any portion of the first scene identified by the updated policy from the subsequent segments of the first video stream;
    transmitting the filtered subsequent segments of the first video stream to the first device;
    receiving a second portion of the merged video stream from the first device, wherein the second portion of the merged video stream comprises the filtered subsequent segments of the first video stream and subsequent segments of the second video stream; and
    displaying the second portion of the merged video stream.

11. The method of claim 10, further comprising receiving an input corresponding to the updated policy.

12. An apparatus comprising:
control circuitry; and
at least one memory including computer program code for one or more programs, the at least one memory and the computer program code configured to, with the control circuitry, cause the apparatus to perform at least the following:
capture a plurality of images of a first scene;
generate a first video stream using the plurality of images;
receive a first policy, wherein the first policy identifies:
a first object of the first scene of the first video stream;
a second object of the first scene of the first video stream;
a first action corresponding to the first object of the first scene of the first video stream; and
a second action corresponding to the second object of the first scene of the first video stream;
a first object of the first scene of the first video stream;
generate a first filtered video stream by including any portion of the first scene identified by the first policy;
transmit the first filtered video stream to a first device;
receive a merged video stream from the first device, wherein the merged video stream comprises the first filtered video stream and a second video stream; and
display the merged video stream.

13. The apparatus of claim 12, wherein the first device is a server.

14. The apparatus of claim 12, wherein the apparatus is further caused, when generating the first filtered video stream by including any portion of the first scene identified by the first policy, to:
remove portions of the first scene not identified by the first policy;
display the first object according to the first action; and
display the second object according to the second action.

15. The apparatus of claim 14, wherein the apparatus is further caused, when displaying the second object according to the second action, to blur the second object in the first filtered video stream.

16. The apparatus of claim 14, wherein the apparatus is further caused, when displaying the second object according to the second action, to replace the second object with a text box in the first filtered video stream.

17. The apparatus of claim 14, wherein the apparatus is further caused, when displaying the second object according to the second action, to replace the second object with a virtual object in the first filtered video stream.

18. The apparatus of claim 17, wherein the apparatus is further caused to receive a selection of the virtual object from the first device.

19. The apparatus of claim 17, wherein the apparatus is further caused to generate the virtual object based on one or more characteristics of the second object.

* * * * *